US010545626B2

(12) United States Patent
Somlai-Fischer et al.

(10) Patent No.: US 10,545,626 B2
(45) Date of Patent: Jan. 28, 2020

(54) PRESENTER/VIEWER ROLE SWAPPING DURING ZUI PERFORMANCE WITH VIDEO BACKGROUND

(71) Applicant: Prezi, Inc., San Francisco, CA (US)

(72) Inventors: Adam Somlai-Fischer, Budapest (HU); Zsuzsa Weiner, Budapest (HU); Igor Lacerdino Alves de Mendonça, Minas Gerais (BR)

(73) Assignee: Prezi, Inc., San Francisco, CA (US)

( * ) Notice: Subject to any disclaimer, the term of this patent is extended or adjusted under 35 U.S.C. 154(b) by 0 days.

(21) Appl. No.: 15/961,207

(22) Filed: Apr. 24, 2018

(65) Prior Publication Data
US 2018/0307754 A1 Oct. 25, 2018

Related U.S. Application Data

(60) Provisional application No. 62/488,919, filed on Apr. 24, 2017.

(51) Int. Cl.
*G06F 3/0481* (2013.01)
*G06F 3/0485* (2013.01)
(Continued)

(52) U.S. Cl.
CPC .......... *G06F 3/0481* (2013.01); *G06F 3/0485* (2013.01); *G06F 3/04845* (2013.01);
(Continued)

(58) Field of Classification Search
CPC .. G06F 3/0481; G06F 16/739; G06F 3/04845; G06F 3/0485; G06F 2203/04806;
(Continued)

(56) References Cited

U.S. PATENT DOCUMENTS

2004/0027313 A1 2/2004 Pate et al.
2008/0249376 A1* 10/2008 Zaleski ............... A61B 5/0006
600/301
(Continued)

OTHER PUBLICATIONS

"U.S. Appl. No. 15/961,197, Non Final Office Action dated Sep. 5, 2019", 43 pgs.

*Primary Examiner* — Thai Q Tran
*Assistant Examiner* — Jose M Mesa
(74) *Attorney, Agent, or Firm* — Schwegman Lundberg & Woessner, P.A.

(57) ABSTRACT

An electronic presentation system is provided comprising: a computer system including: a processor; a storage device including a plurality of instructions executable by the processor; a display screen; an image frame buffer comprising a sequence of motion picture image frames; wherein the instructions include instructions that configure the processor to cause the display screen to display a sequence of display element transitions responsive to user commands; instructions that configure the processor to composite the motion picture images of the physical scene and a sequence of display element transitions by prioritizing display of the motion picture images of the physical scene in a prioritized scene region of the display screen and prioritizing display of the sequence of display element transitions in a prioritized display region of the display screen.

19 Claims, 23 Drawing Sheets

(51) Int. Cl.
    *G06T 3/40* (2006.01)
    *G09G 5/14* (2006.01)
    *H04N 5/232* (2006.01)
    *G06F 16/738* (2019.01)
    *G06F 3/0484* (2013.01)

(52) U.S. Cl.
    CPC .............. *G06F 16/739* (2019.01); *G06T 3/40* (2013.01); *G09G 5/14* (2013.01); *H04N 5/23216* (2013.01); *H04N 5/23293* (2013.01); *H04N 5/23296* (2013.01); *G06F 2203/04806* (2013.01)

(58) Field of Classification Search
    CPC ...... G06T 3/40; G09G 5/14; G09G 2340/045; G09G 2340/14; G09G 5/006; G09G 5/00; H04N 5/23216; H04N 5/23293; H04N 5/23296
    See application file for complete search history.

(56) References Cited

U.S. PATENT DOCUMENTS

| | | | |
|---|---|---|---|
| 2010/0310232 A1* | 12/2010 | Iwase | G11B 27/34 386/241 |
| 2012/0081611 A1* | 4/2012 | Tan | G09B 5/02 348/584 |
| 2014/0372894 A1* | 12/2014 | Pandy | G06F 3/0484 715/732 |
| 2016/0027201 A1* | 1/2016 | Saito | H04N 5/23216 345/475 |
| 2016/0110901 A1* | 4/2016 | Connolly | G06T 11/60 345/661 |
| 2018/0307380 A1 | 10/2018 | Somlai-fischer et al. | |
| 2018/0307754 A1 | 10/2018 | Somlai-fischer et al. | |

\* cited by examiner

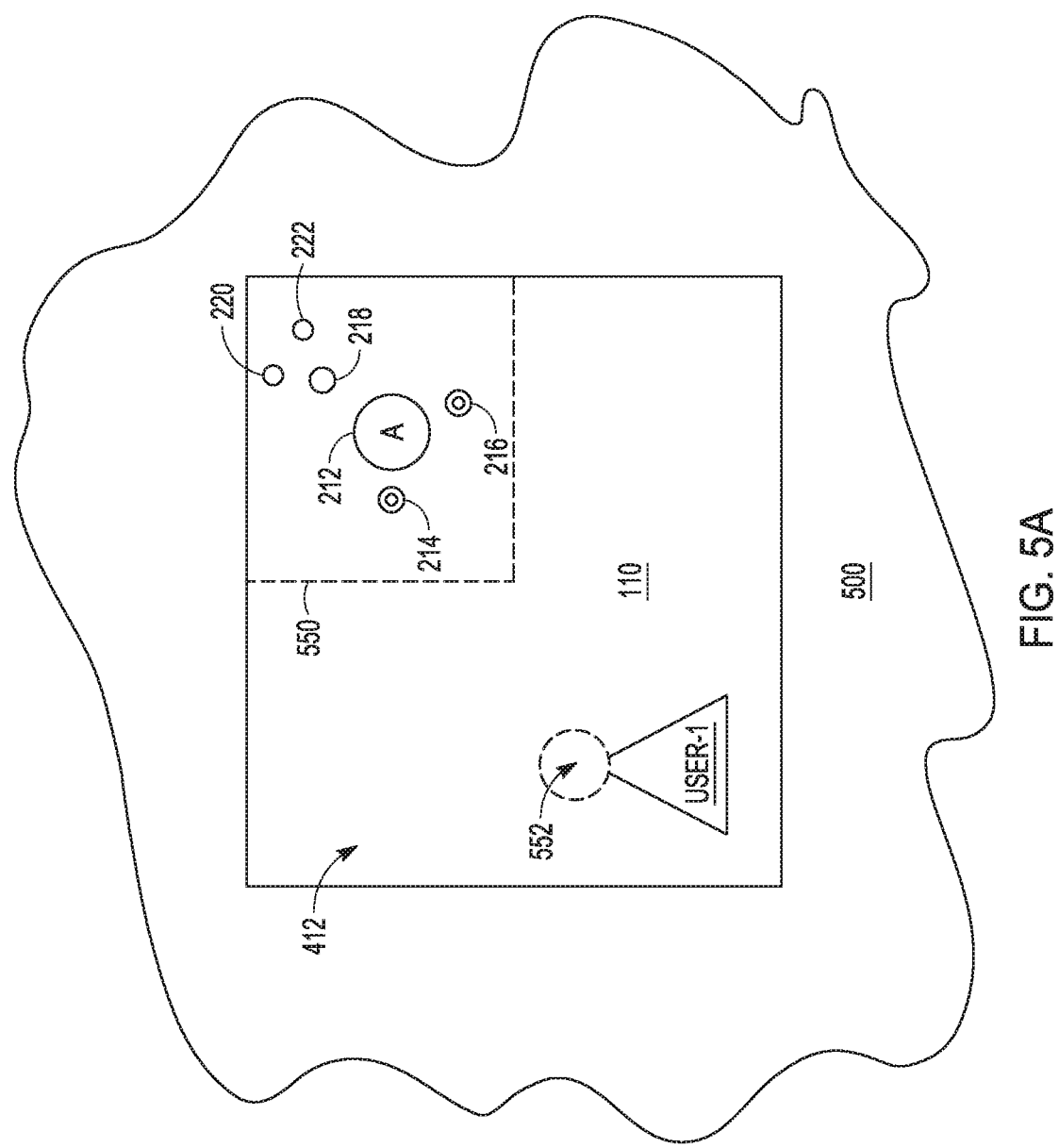

PRESENTER/VIEWER ROLE SWAPPING DURING ZUI PERFORMANCE WITH VIDEO BACKGROUND

RELATED APPLICATION

The present Nonprovisional U.S. Patent Application claims the benefit of the previous U.S. Provisional Patent Application entitled "System and Method to Composite a ZUI Motion Picture Presentation and Physical Scene Motion Picture Presentation" filed with the U.S. Patent Office on Apr. 24, 2017 and having Ser. No. 62/488,919, which is expressly incorporated herein in its entirety by this reference.

BACKGROUND

A zooming user interface (ZUI) is a type of graphical user interface (GUI) in which the scale of a viewed area is changed in order to view more detail or less, and to browse through and among different visual display elements such as images, shapes, documents, or videos. Display elements may be added to a graphical workspace referred to as a 'canvas' to create a zoomable presentation in which details and subtopics can be presented through zooming in and out to reveal more or to reveal less detail. Typically, the canvas is larger than a ZUI viewing window generated on an electronic device display screen, and a user can scroll a ZUI viewing window across the canvas to view different display elements disposed on different regions of the canvas. The ZUI differs from a normal canvas in that the user may zoom in or out from a display element. Display elements can be inserted anywhere among the presentation content. Users can pan across the canvas in two dimensions (in 2D) and zoom into objects of interest. Display elements present inside a zoomed region can in turn be zoomed themselves to reveal additional detail, allowing for recursive nesting and an arbitrary level of zoom. For example, as a user zooms into a text object, the text may be represented initially as a small dot, then as a thumbnail image, next as a complete page and finally as a magnified view of a portion of the page focused on a key passage from the text. After zooming in to view a display element, a user may zoom out and pan across the canvas and zoom in to a different display element. Thus, ZUIs use zooming as the primary metaphor for browsing through multivariate or hyperlinked information, for example.

SUMMARY

In one aspect, an electronic presentation system is provided that includes a computer system including: a processor; a storage device including a plurality of instructions executable by the processor; a display screen; an image frame buffer comprising a sequence of motion picture image frames; wherein the instructions include instructions that configure the processor to cause the display screen to display a sequence of display element transitions responsive to user commands; instructions that configure the processor to composite the motion picture images of the physical scene and a sequence of display element transitions by prioritizing display of the motion picture images of the physical scene in a prioritized scene region of the display screen and prioritizing display of the sequence of display element transitions in a prioritized display region of the display screen.

In another aspect, an electronic display method is provided. Motion picture images of a physical scene are recorded in a sequence of motion picture image frames. User commands are received at a user interface during the displaying of the motion picture images. A sequence of display element transitions responsive to the received user commands are displayed. The motion picture images of the physical scene and the sequence of display element transitions are composited on the display screen by prioritizing display of the motion picture images of the physical scene in a prioritized scene region of the display screen and prioritizing display of the sequence of display element transitions in a prioritized display region of the display screen.

BRIEF DESCRIPTION OF THE DRAWINGS

FIGS. 5A-5H are illustrative drawings show a role-swapping machine's display screen displaying a sequence of composited physical scene frames and ZUI frames corresponding to the sequence target display elements of the ZUI transition sequence of FIG. 3A and FIG. 4.

DESCRIPTION OF EMBODIMENTS

Example Machine Architecture

Figure 1A:
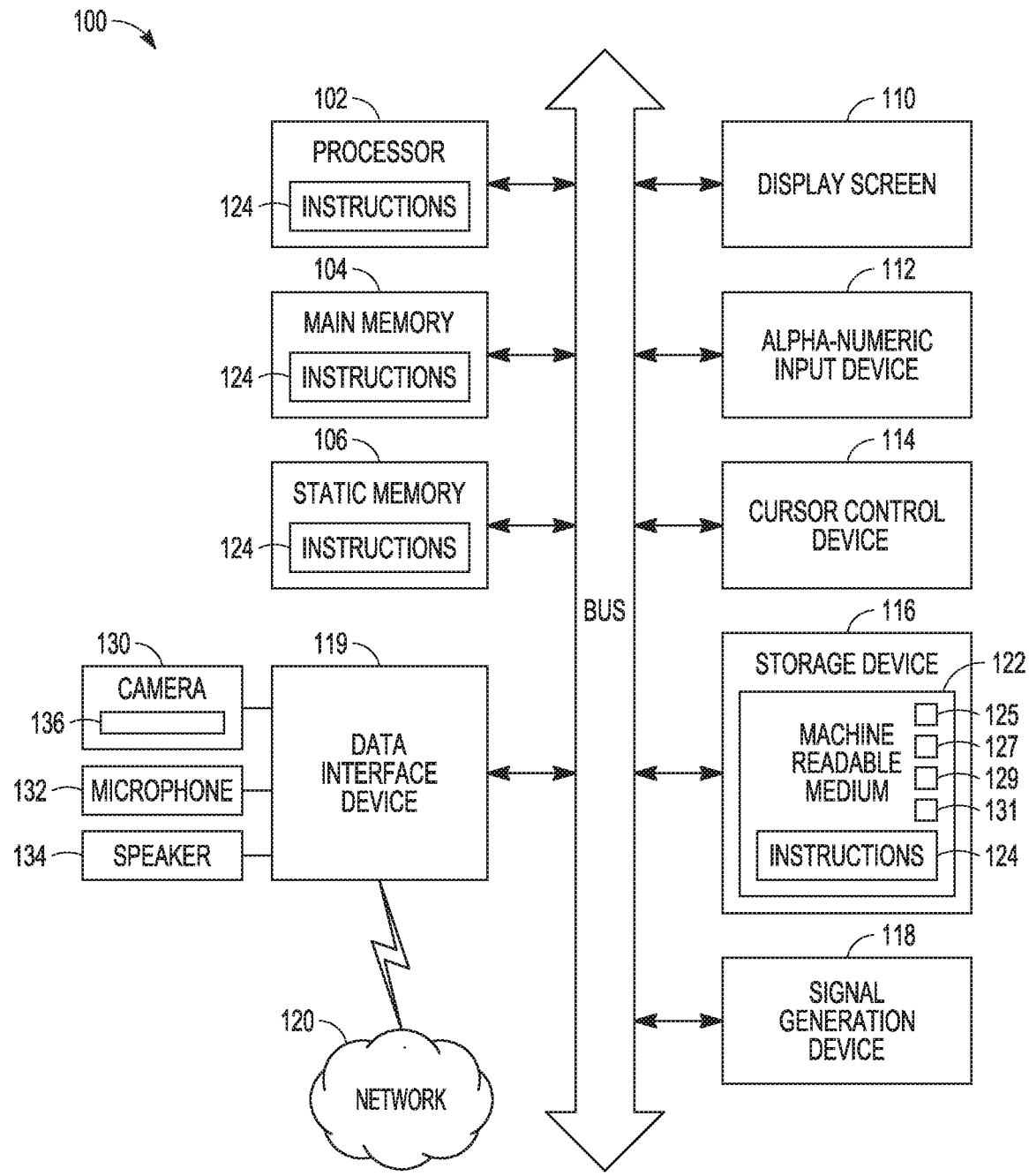
FIG. 1A is an illustrative block diagram showing components of a machine, according to some example embodiments, able to read instructions from a machine-readable medium (e.g., a hardware machine-readable storage medium) and perform any one or more of the methodologies discussed herein.

FIG. 1 shows an illustrative diagrammatic representation of a machine 100 in the example form of a computer system within which a set of instructions 124 is included that may be executed, to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a tablet, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 100 includes a processor 102 (e.g., a central processing unit (CPU), a graphics processing unit (GPU), or both), a main memory 104 and a static memory 106, which communicate with each other via a bus 108. The machine 100 may further include a display screen 110 (e.g., liquid crystal display (LCD), organic light emitting diode (OLED), touch screen, or a cathode ray tube (CRT)). The machine 100 also includes one or more user input devices to receive user input commands. The user interface input devices of the illustrative system include an alphanumeric user interface input device 112 (e.g., a physical or virtual keyboard), a user interface cursor control device 114 (e.g., a mouse, a touch screen, a touchpad, a trackball, a trackpad), a non-transitory storage device 116, a signal generation device 118 (e.g., a speaker) one or more data interfaces 119 including an interface to a network interface device 120. The data interfaces 119 may be wired or wireless to send and receive information such as motion picture camera image information or network information, for example. In some embodiments, the data interface 119 is coupled to a motion picture camera 130, a microphone 132, and a speaker 134. The motion picture 130 may include a sensor 136 configured for facial detection and gesture detection.

The storage device 116 includes a machine-readable medium 122 on which is stored one or more sets of instructions 124 (e.g., software) data structures 125 (e.g., ZUI command index structure) embodying any one or more of the methodologies or functions described herein. The machine-readable medium 122 also may store ZUI presentation motion picture frames 127, which include display elements, and physical scene motion picture frames 129. The machine-readable medium 122 also may store a ZUI presentation 131, which provides associations between ZUI commands and display element transitions within the ZUI presentation motion picture frames 127. The storage device may include one or more of a disk drive, solid-state memories, optical and magnetic media, for example. The instructions 124 may also reside, completely or at least partially, within the main memory 104 and/or within the processor 102 during execution thereof by the computer system 100, the main memory 104 and the processor 102 also constituting machine-readable media. The instructions 124, data structures 125 and motion picture pixel frames 127, 129 may further be transmitted or received over the network 120 via the network interface device 119.

Figure 1B:
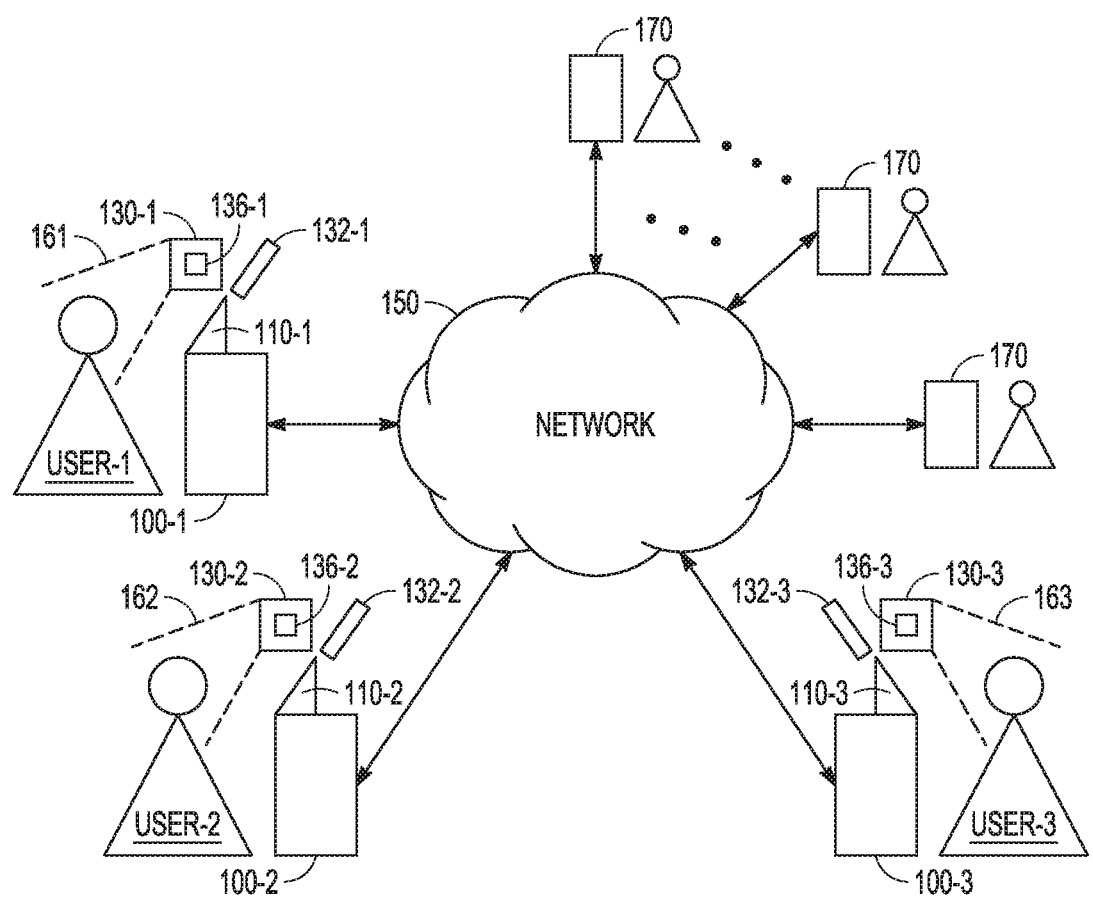
FIG. 1B is an illustrative drawing showing first, second and third example machines communicatively coupled over a network and configured to perform a ZUI presentation involving swapping of presenter/viewer roles.

Machine Configuration for Presenter/Viewer Role-Swapping with Video Background FIG. 1B is an illustrative drawing showing first, second and third example machines 100-1, 100-2, 100-3 communicatively coupled over a network 150 to perform a ZUI presentation involving swapping of presenter/viewer roles. A first machine 100-1 with display screen 110-1 configured for role-swapping is associated with a first camera 130-1, first microphone 132-1 to capture motion picture images and sounds of a first physical scene 161 that includes a first role-swapping user (user-1) during a role swapping ZUI presentation. A second machine 100-2 with display screen 110-2 configured for role-swapping is associated with a second camera 130-2 and a second microphone 132-2 to capture motion picture images and sounds of a second physical scene 162 that includes a third role-swapping user (user-2) during the ZUI presentation. A third machine 100-3 with display screen 110-3 configured for role-swapping is associated with a third camera 130-3 and a third microphone 132-3 to capture motion picture images and sounds of a third physical scene 163 that includes a third role-swapping user (user-3) during the ZUI presentation. Additionally, audience machines 170 are coupled over the network 150 users may act solely as viewer machines for use by non-roll swapping users who may view the ZUI presentation on their machines' display screens but may not acting as presenters.

The first, second and third machines 100-1,100-2, 100-3 are configured to swap between a role as presenter and a role as a viewer. One of the three example machines at a time may be configured in a presenter mode to act as a 'presenter machine', and the other two may be configured in a viewer mode to act as 'viewer machines'. During a role-swapping ZUI performance, identical ZUI presentations are simultaneously displayed on the display screens 110-1, 110-2, 110-3 each of the three role-swapping machines 100-1, 100-2, 100-3 together with real-time motion picture images of a physical scene (161, 162 or 163) at a location of a current presenter machine (100-1, 100-2 or 100-3). The ZUI presentations displayed on the display screens 110-1, 110-2, 110-3 are synchronized so that ZUI viewing windows visible on the display screens 110-1, 110-2, 110-3 on the machines are simultaneously panned and zoomed to matching canvas locations. Thus, all viewers may simultaneously view on their respective screen displays a composite image of a physical scene captured at the presenter machine and matching ZUI canvas locations.

More particularly, each role-swapping machine 100-1, 100-2, 100-3, while designated as a presenter machine, is configured to send motion picture images of a physical scene within a field of view of a camera at the current presenter machine over the network 150 to machines in the viewer mode (viewer machines). Each role-swapping machine is further configured to send to viewer machines over the network 150 ZUI information indicating portions of a ZUI presentation to composite with portions of the physical scene images. Each viewer machine is configured to composite physical scene motion picture images received over the network from a presenter machine with portions of a ZUI presentation, based upon ZUI compositing information sent over the network 150 by the presenter machine.

A user of a current presenter machine may use his or her own style in image and voice to narrate portions of the ZUI presentation. In accordance with some embodiments, the current presenter may control transitions between ZUI display elements so as to determine the timing and/or flow of the ZUI presentation. In accordance with some embodiments, the machines may include user interface gesture sensors 136-1, 136-2, 136-3 responsive to user gestures, such as hand gestures, that may act as a user interface to detect when portions of a presenter's hands indicate selection of a portion of a ZUI display element so as to trigger a ZUI panning and/or zooming transition to bring a different display element into a focus as a center of attention. Following an occurrence of a swapping of roles, a different one of the role-swapping machines 100-1, 100-2, 100-3 becomes the presenter and a user of that machine then may control the ZUI and use his or her own style in words, facial expressions, body motions and props to narrate portions of the ZUI.

In various example embodiments, one or more portions of the network 680 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. Motion picture image information, ZUI information, and instructions to configure the machines during role-swapping may be transmitted and received by the machines over the network 680 using a transmission medium via a network interface device (e.g., a network interface component included in the communication components 664) and utilizing any one of a number of well-known transfer protocols (e.g., HTTP). The term "transmission medium" shall be taken to include any intangible medium that is capable of storing, encoding, or carrying the instructions 616 for execution by the machine 600, and includes digital or analog communications signals or other intangible media to facilitate communication of such software.

Video Background

A video background to a presentation sequence is created by compositing on a display screen, motion picture video images captured by a camera associated with a presenter machine with presentation sequence displays corresponding to user input commands received by the machine during the video image capture. The presentation sequence may comprise a sequence of ZUI display elements, such as boundary display elements, or a sequence of slides, for example. User commands control navigation through the presentation sequence. A user may navigate a ZUI presentation by inputting to a presenter machine a ZUI command indicating a next ZUI display element. A user may navigate a slide sequence forward or backward, for example, by inputting to a presenter machine a forward or backward command. The received user commands may be time-aligned with captured motion picture video images. During compositing, prioritization may be used to select whether to display a portion of a motion picture video image or to display a portion of a ZUI display element or slide at display screen locations where there is an overlap.

Role Swapping with Video Background Examples

A ZUI presentation may contain information from different knowledge domains, such as science, politics and business, and different role-swapping users may be especially expert in one of these three areas, for example. Role swapping may be employed to align the knowledge domain within the ZUI presentation with the presenter having corresponding expertise. The science expert may use the example first role-swapping machine 100-1 to act a presenter of the ZUI portion focused on science; the political expert uses the second a role-swapping machine 100-2 to act as presenter of the ZUI portion focused on politics; and the business expert may use the third role-swapping machine 100-3 to act as presenter of the ZUI portion focused on business. Cameras and microphones associated with the machines used by the experts may capture physical scene frames containing an expert's physical presentation (e.g., lecture or performance) and the expert's indications portions of the ZUI presentation to be composited with the physical scene frames showing the expert's physical presentation. The physical scene frames and indications of ZUI portions may be sent over the network 150 for composting at the viewer machines. Thus, role-swapping may be used to provide over the network presentations by different presenters using a shared ZUI presentation. The ZUI presentation may be synchronized as between presenter and viewers such that ZUI navigation by each presenter on the presenter's machine also occurs and is displayed upon all viewer machines. Thus, for example, audience viewers may enjoy the benefit of receiving motion pictures of multiple expert lecturers plus indications of ZUI navigation instructions provided by the experts that may be used at viewer machines to composite the received motion pictures with corresponding navigations through the ZUI presentation.

Role swapping during a ZUI presentation also may facilitate active learning on-line. A ZUI presentation may comprise a lesson plan to be presented during an on-line classroom session, for example. A role-swapping machine such as the first machine 100-1 may be used by a professor in an on-line classroom course and other role-swapping machines may be used by students in the on-line classroom course. The ZUI presentation may provide the role-swapping professor and students with context for an on-line interactive discussion. For example, while a professor's role-swapping machine 100-1 is configured as a presenter machine, the machine's camera 130-1 and microphone 132-1 may capture the professor's image and voice as the professor navigates within the ZUI presentation to different display elements to make or emphasize teaching points. The professor's captured images and voice and an indication of the ZUI navigation are sent over the network 150 for display at student-viewers' display screens such as 110-2, 110-3. The students' display screens may display the professor professor's image and voice together with navigation within the ZUI under the professor's control. A role-swapping student viewer may use her machine such as machine 100-2 to send a message over the network 150 to the professor's machine 100-1 indicating that she has a question. The student may send an electronic message such as a chat message or email may send a voice message that may be audible to the professor and to other viewers over a speaker 132-1 at the professor's machine 100-1. The presenter-professor may surrender presentation control to the student so that roles swap and the student's machine 100-2 becomes the presenter machine and the student becomes the presenter. The presenter-student then may use the display screen 100-2 of his or her machine 100-2 to refer to display elements within the ZUI, which is synchronized on all viewers' display screens, to ask questions or to make a point. The presenter-student may even use his or her machine 100-2 navigate the ZUI to different display elements to adjust the context for a question or a point to make. While the student's role-swapping machine 100-2 is configured as a presenter machine, the machine's camera 130-2 and microphone 130-2 may capture the student's image and voice as the student navigates within the ZUI presentation. The student's captured image and voice and an indication of the ZUI navigation are sent over the network 150 for display at other student-viewers' display screens 110-3 and at the professor's display screen 110-1. The students' and professor's display screens 110-1, 110-2, 110-3 may display the student's image and voice together with navigation within the ZUI under the student's control. After the presenter-student finishes asking the question or making the point, roles may be swapped to once again designate the professor's roll-swapping machine 100-1 as the presenter machine so that the professor again appears on all viewers' display screens 110-2, 110-3 together with the synchronized ZUI presentation. The professor then may use the presenter machine 110-1 respond by speaking or motioning or navigating within the ZUI. The professor's response is captured by the camera 130-1 and microphone 132-1 of the professor's machine 100-1 and is sent together with indications of navigations within the ZUI over the network 150 to the viewer machines 100-2, 100-3 of the students. In some embodiments, the professor's machine 100-1 may be configured to override a presenter-student's presentation to at any time revert presenter status to the professor. Thus, a ZUI presentation may provide a framework for an interactive exchange between professor and student in an on-line class; the exchange may be observed by other students in the on-line class who may learn from it.

ZUI Presentation Example

Figure 2A:
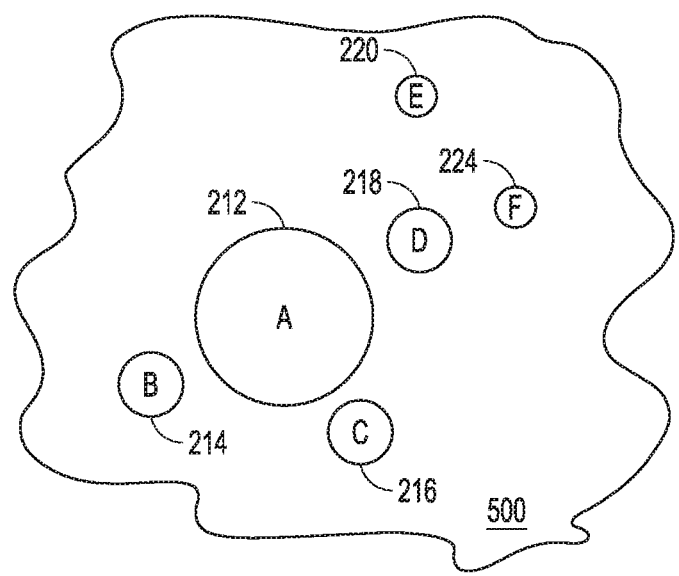
FIG. 2A is an illustrative drawing representing example display elements of an example ZUI presentation disposed on a canvas displayed on a computer display screen.

FIG. 2A is an illustrative drawing representing example display elements 212, 214, 216, 218, 220, 222 of an example ZUI presentation disposed on a canvas 500 that may be displayed on the first second and third user display screens 110-1, 110-2, 110-3. Instructions 124 stored in the storage devices of the first, second and third machines 100-1, 100-2, 100-3 may configure the CPUs of the machines to use ZUI motion picture frames 127 stored in the storage devices to display on the display screens 110-1, 110-2, 110-3, ZUI presentation motion picture images that include the display elements. The display elements may include text, images, shapes, boundary, documents, videos, or audio files, presented within them, for example. A boundary display element may act as a visual container that bounds another display element such as an image or text, for example. First boundary display element 212 encompasses text display element A. Second boundary display element 214 encompasses text display element B. Third boundary display element 216 encompasses text display element C. Fourth boundary display element 218 encompasses text display element D. Fifth boundary display element 220 encompasses text display element E. Sixth boundary display element 222 encompasses text display element F.

Different display elements may have different sizes. In a ZUI presentation, size may represent hierarchy. Specifically, the size of a display element may represent its hierarchical position in a ZUI presentation. During a ZUI presentation, multiple display elements having different sizes may be displayed simultaneously in whole or in part within a viewing window, and differences in their sizes indicates differences in their positions in the ZUI presentation hierarchy. Zooming determines the proportion of the viewing window occupied by a display element, and therefore, its apparent size and prominence from the perspective of a user. During a pause, a display element encompassed within the viewing window and zoomed to a level to be clearly visible to a user becomes the temporarily center of attention, even though the viewing window also may encompass other display elements displayed too small to be clearly visible or displayed so large as to be only partially encompassed by the viewing window.

Figure 2B:
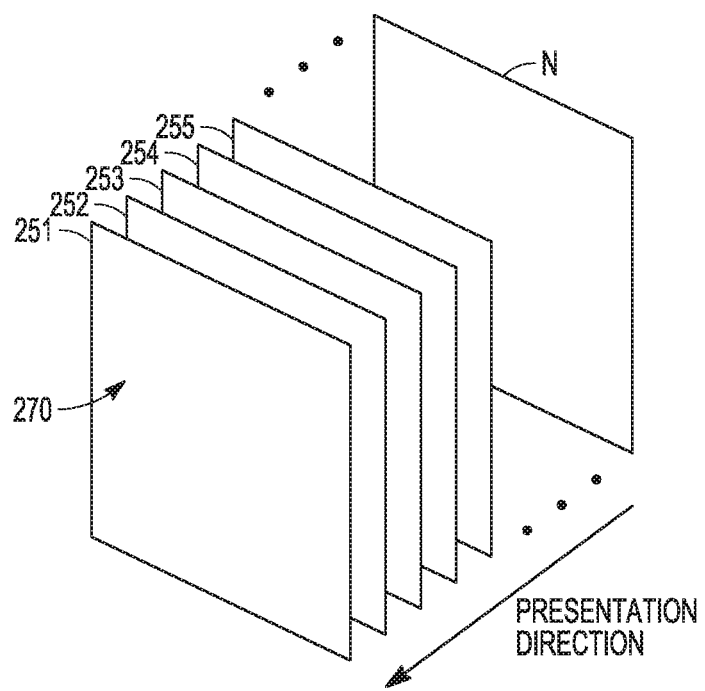
FIG. 2B is an illustrative drawing representing example display elements of an example flat presentation for display on a computer display screen.

FIG. 2B is an illustrative drawing representing example display elements of an example flat presentation 250 for display on a computer display screen 110. A sequence of two-dimensional slides 251-N are arranged in a presentation sequence order indicated by the arrow labeled 'presentation direction.' Slides may be presented in one flat presentation plane 270, with no panning or zooming transition from one slide to the next.

ZUI Navigation Control

Figure 3A:
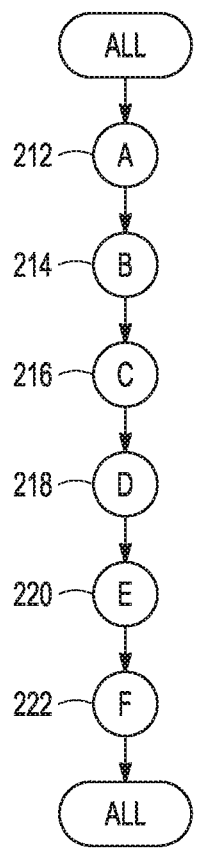
FIGS. 3A-3C are illustrative flow diagrams indicating three example sequences of transitions between display elements in the example ZUI presentation of FIG. 2A.
Figure 3B:
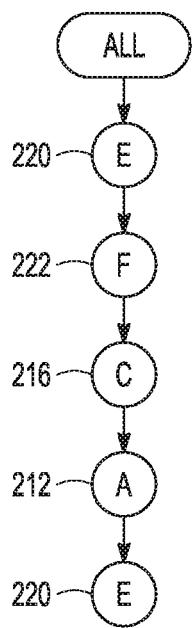
Figure 3C:
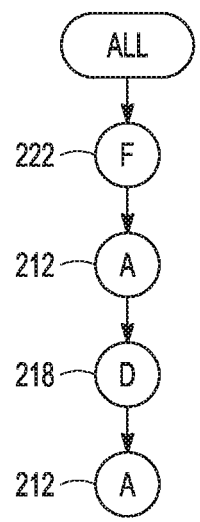

FIGS. 3A-3C are illustrative flow diagrams indicating three example sequences of transitions between display elements in the example ZUI presentation of FIG. 2A. The ZUI presentation displays a sequence of motion picture images in which a sequence of display elements are displayed within a viewing window. A user may provide input commands to select a sequence order in which display elements portrayed by the motion picture images are displayed within a viewing window. A typical ZUI sequence of motion picture images displays transitions between display elements in which panning across and zooming in to and out from the canvas 500 may occur. The panning causes display elements to appear to move across a viewing window in a horizontal direction within a horizontal (x, y) plane. The zooming causes display elements to appear to move within a viewing window in a vertical z direction perpendicular to the horizontal plane. Together, the panning and zooming constitute navigation between display elements within the ZUI. A transition between display elements may include zero or more temporary pauses at intermediate display elements that come into view during the transition. The intermediate display elements in a transition may provide a user with context indicating relationships between a starting display element in the transition and a target destination display element in the transition. During a pause, panning and zooming stops temporarily so that the view of the canvas is temporarily stationary so that a viewer may have a prolonged view of one or more display elements within the viewing window during the pause. A transition initiated in response to a command may halt, when a target destination display element comes within view within the viewing window. A user may provide further commands to initiate further ZUI transitions.

Referring to the example first transition sequence of FIG. 3A, the sequence of transitions progresses under user control in order from display of all of the display elements to the first display element 212 with text A, to the second display element 214 with text B, to the third display element 216 with text C, to the fourth display element 218 with text D, to the fifth display element 220 with text E, to the sixth display element 222 with text F, and back to display of all of the display elements. Referring to the example second transition sequence of FIG. 3B, the sequence of transitions progresses under user control in order from display of all of the display elements to the fifth display element 220 with text E, to the sixth display element 222 with text F, to the third display element 216 with text C, to the first display element 212 with text A, and back to the fifth display element 220 with text E. Referring to the example third transition sequence of FIG. 3C, the sequence of transitions progresses under user control in order from display of all of the display elements to the sixth display element 222 with text F, to the first display element 212 with text A, to the fourth display element 218 with text D, to the first display element 212 with text A, to the fourth display element 218 with text D.

ZUI Presenter/Viewer Role Swapping

In accordance with some embodiments, performance of a ZUI may involve presenter/viewer role swapping in which user roles change in the course of display of a ZUI presentation. Instructions within storage devices of the machines 100-1, 100-2, 100-3 may configure the machines to swap the role controlling flow of the ZUI presentation on the first, second and third display screens 110-1, 110-2, 110-3 in response to role-control instructions that may be transmitted over the network between machines participating in a ZUI presentation. For example, user control of transitions between display elements may change in the course of the first transition sequence of FIG. 3A. More particularly, for example, user-1 may act as presenter and user-2 and user-3 may act as viewers during a transition from display 'all' of the display elements to the first display element 212 with text A and during the transition from the first display element 212 to the second display element 214 with text B. In this example, user-2 may act as presenter and user-1 and user-3 may act as viewers during a transition from the second display element 214 to the third display element 216 with text C and the during the transition from the third display element 216 to the fourth display element 218 with text D. In this example, user 3 may act as the presenter and user-1 and user-2 may act as viewers during the transition from the fourth display element 218 to the fifth display element 220 with text E. In this example, user 1 may act as the presenter and user-2 and user-3 may act as viewers during the transition from the fifth display element 220 to the sixth display element 222 with text F, and during the transition back to display of 'all' of the display elements.

Figure 4:
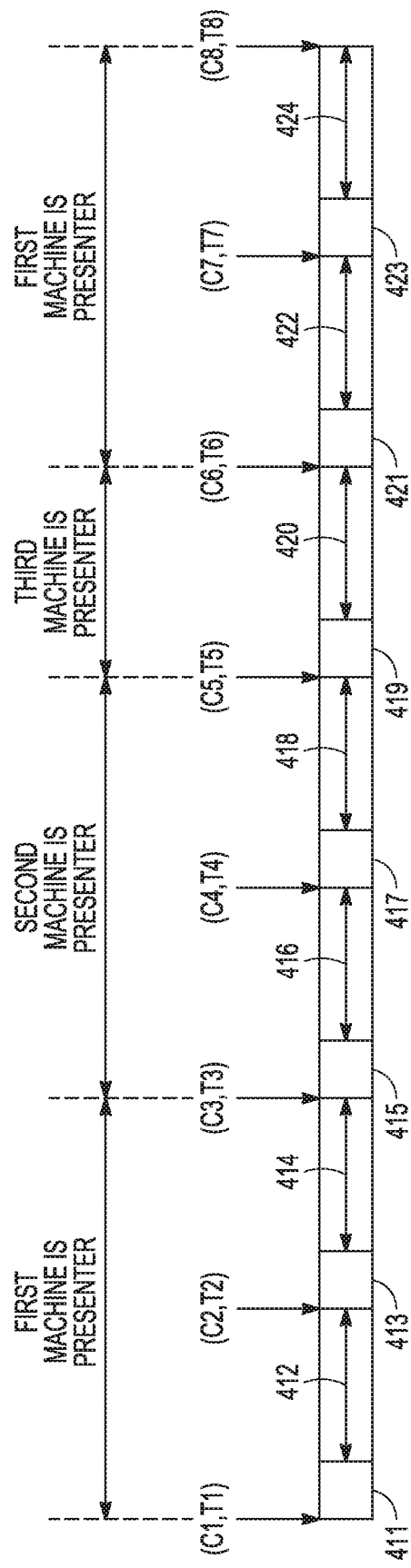
FIG. 4 is an illustrative drawing representing a sequence of example ZUI presentation motion picture image segments 402 involving role swapping during the example first transition sequence of FIG. 3A.

FIG. 4 is an illustrative drawing representing a sequence of example ZUI presentation motion picture image segments 402 involving role swapping during the example first transition sequence of FIG. 3A. It will be appreciated that although role swapping is described below with reference to the first example transition sequence of FIG. 3A, role swapping also can be performed in the context of the second and third example transition sequences of FIGS. 3B-3C. ZUI commands provided by a user provide an indication of the user's navigation within a ZUI presentation. More particularly, a machine may be configured with instructions to cause a ZUI presentation to transition between display elements in response to a user providing ZUI commands.

A ZUI presentation may include a sequence of transitional motion picture images displayed in the course of a ZUI transition from one display element to the next. In some embodiments, a ZUI presentation may be configured to provide a transitional motion picture sequence that leads up to a target display element where the transition halts. As explained above, a transitional motion sequence may temporarily pause at one or more intermediate display elements while the ZUI transitions from a starting display element to a target destination display element. The transitional motion picture images and the sequence of target display elements are displayed through a ZUI viewing window, which may be coextensive with the display screens 110-1, 110-2, 110-3.

Still referring to FIG. 4, at time T1, user-1 acts a presenter and user-2 and user-3 act as viewers. At time T1 a first user input command C1 provided by user-1 is received at the first machine 100-1. In this example, the first user command C1 indicates that display element 212 is the next target display element. The first machine 100-1 is configured to initiate first ZUI transitional motion picture frames 411 in response to the first command C1, which lead up to motion picture frames 412 showing images of the target display element 212. The frames of the first ZUI transition 411 show panning and/or zooming of the ZUI canvas 500 to focus user attention on the first display element 212 with text A. It will be appreciated that panning and zooming during the transition from a display of all display elements within a viewing window to the display of the target first display element 212 within the zooming window may involve one or more pauses at other intermediate display elements (not shown). In this example, the first ZUI transition halts at the target first display element 212 until either a next user command is received to indicate a next target display element or for predetermined time interval after which a predetermined transition to a next display element may automatically begin. In this example, the first paused ZUI motion picture image 412 showing display element 212 is displayed during a time interval between time T1 and T2. In this example, at time T2 before passage of the predetermined time interval, a second user input command C2 provided by user-1 is received at the first machine 100-1. In this example, the second user command C2 indicates that display element 214 is the next target display element. The first machine 100-1 is configured to initiate second ZUI transitional motion picture frames 413 in response to the second command C2, which lead up to motion picture frames 414 showing images of the target display element 214. The frames of the second ZUI transition 413 show panning and/or zooming of the ZUI canvas 500 to focus user attention on the second display element 214 with text B. Panning and zooming to transition from a focus on the first display element 212 within the viewing window to a focus on second display element 214 within the zooming window may involve temporary pauses at other intermediate display elements (not shown). In this example, the second ZUI transition 413 halts at the second display element 214. In this example, the second paused ZUI motion picture image 414 showing display element 214 is displayed during a time interval between time T2 and T3.

Roles are swapped at a time between the second ZUI transition 413 and a third ZUI transition 415. User-2 becomes presenter and user-1 and user-3 act as viewers. In this example, at time T3 before passage of the predetermined time interval, a third user input command C3 provided by user-2 is received at the second machine 100-2. In this example, the third user command C3 indicates that third display element 216 is the next target display element. The second machine is configured to initiate third ZUI transitional motion picture frames 415 in response to the third command C3, which lead up to motion picture frames 416 showing images of the target third display element 216. The frames of the third ZUI transition 415 show panning and/or zooming of the ZUI canvas 500 to bring the third display element 216 with text C into view. Panning and zooming to transition from a focus on the second display element 214 within the viewing window to a focus on third display element 216 within the zooming window may involve temporary pauses at other intermediate display elements (not shown). In this example, the third ZUI transition 415 halts at the third display element 216. In this example, at time T4 before passage of the predetermined time interval, a fourth user input command C4 provided by user-2 is received at the second machine 100-2. In this example, the fourth user command C4 indicates that fourth display element 218 is the next target display element. The second machine 100-2 is configured to initiate fourth ZUI transitional motion picture frames 417 in response to the fourth command C4, which lead up to motion picture frames 418 showing images of the display element 218. The frames of the fourth ZUI transition 417 show panning and/or zooming of the ZUI canvas 500 to bring the fourth display element 218 with text D into view. Panning and zooming to transition from a focus on the third display element 216 within the viewing window to a focus on fourth display element 218 within the zooming window may involve temporary pauses at other intermediate display elements (not shown). In this example, the fourth ZUI transition 417 halts at the fourth display element 218. In this example, the fourth paused ZUI motion picture image 418 showing display element 218 is displayed during a time interval between time T4 and T5.

Roles are again swapped at a time between the fourth ZUI transition 417 and a fifth ZUI transition 419. User-3 becomes presenter and user-1 and user-2 act as viewers. In this example, at time T5 before passage of the predetermined time interval, a fifth user input command C5 provided by user-3 is received at the third machine 100-3. In this example, the fifth user command C5 indicates that fifth display element 220 is the next target display element. The third machine 100-3 is configured to initiate fifth ZUI transitional motion picture frames 419 in response to the fifth command C5, which lead up to motion picture frames 420 showing images of the display element 220. The frames of the fifth ZUI transition 419 show panning and/or zooming of the ZUI canvas 500 to bring the fifth display element 220 with text E into view. Panning and zooming to transition from a focus on the fourth display element 218 within the viewing window to a focus on fifth display element 220 within the zooming window may involve temporary pauses at other intermediate display elements (not shown). In this example, the fifth ZUI transition 419 halts at the fifth display element 220. In this example, the fifth paused ZUI motion picture image 420 showing display element 220 is displayed during a time interval between time T5 and T6.

Roles are yet again swapped at a time between the fifth ZUI transition 419 and a sixth ZUI transition 421. User-1 becomes presenter and user-2 and user-3 act as viewers. In this example, at time T6 before passage of the predetermined time interval, a sixth user input command C6 provided by user-1 is received at the first machine 100-1. In this example, the sixth user command C6 indicates that sixth display element 222 is the next target display element. The first machine 100-1 is configured to initiate sixth ZUI transitional motion picture frames 421 in response to the sixth command C6, which lead up to motion picture frames 422 showing images of the display element 222. The frames of the sixth ZUI transition 421 show panning and/or zooming of the ZUI canvas 500 to bring the sixth display element 222 with text F into view. Panning and zooming to transition from a focus on the fifth display element 220 within the viewing window to a focus on sixth display element 222 within the zooming window may involve temporary pauses at other intermediate display elements (not shown). In this example, the sixth ZUI transition 421 halts at the sixth display element 222. In this example, the sixth paused ZUI motion picture image 422 showing display element 222 is displayed during a time interval between time T6 and T7. In this example, at time T7 before passage of the predetermined time interval, a seventh user input command C7 provided by user-1 is received at the first machine 100-1. In this example, the seventh user command C7 indicates to display 'all' display elements. The first machine 100-1 is configured to initiate seventh ZUI transitional motion picture frames 423 in response to the seventh command C7, which lead up to motion picture frames 424 showing images of the 'all' display elements i.e. the entire ZUI presentation. The frames of the seventh ZUI transition 423 show panning and/or zooming of the ZUI canvas 500 to bring tall display elements into view. Panning and zooming to transition from a focus on the sixth display element 222 within the viewing window to a focus on all display elements within the zooming window may involve temporary pauses at other intermediate display elements (not shown). In this example, the seventh ZUI transition 423 halts at the display of all elements.

FIGS. 5A-5H are illustrative drawings show a role-swapping machine's display screen displaying a sequence of composited physical scene frames and ZUI frames corresponding to the sequence target display elements of the ZUI transition sequence of FIG. 3A and FIG. 4. In order to provide a better understanding of panning and zooming navigation of the ZUI presentation during the ZUI transition sequence of FIG. 3A and FIG. 4, the illustrative drawings of FIGS. 5A-5H show both ZUI display elements encompassed within the viewing window, which is coextensive with the display screen, and ZUI display elements outside of a viewing window the ZUI transition sequence of FIG. 3A and FIG. 4. It will be appreciated that the screen display of each roll-swapping machine and of each audience machine displays the sequence of motion picture backgrounds and ZUI portions shown in FIGS. 5A-5H.

In some embodiments, the viewing window includes an offset region 550 where successive target display elements are displayed during successive pauses in panning and zooming during display of a ZUI presentation. The display of the ZUI presentation is targeted such that during a transition to a pause, the canvas 500 is panned and zoomed to maneuver a next target display element to a position within the offset region at a legibly visible zoom level. As explained more fully below, the offset region is selected to be offset from a prioritized scene region of another motion picture sequence that is composited on the display screen with the ZUI presentation. A transition between display elements in a ZUI presentation involves a motion picture display showing movement of a canvas 500, either planar or zooming or a combination of both, to change the portion of the canvas displayed within the viewing window. It will be appreciated that zooming movement, while changing the distance of the canvas from the viewing window, also changes the range of planar locations displayed within the viewing window. The more distant the canvas is from the viewing window, the larger the planar range of planar locations on the canvas that are displayed within the viewing window. The closer the canvas is to the viewing window, the narrower the range of planar locations on the canvas that are displayed within the viewing window. A target display element is a display element to which the ZUI presentation transitions, through panning and zooming of the canvas, to temporarily, during a pause, become a center of attention of a user watching the viewing window.

FIG. 5A is an illustrative drawing showing an image of user-1 and a ZUI image with all ZUI display elements during display of the target ZUI motion picture image 412 of FIG. 4. In this example, user-1 is the presenter and the first machine 100-1 is configured to act as the presenter machine. A first physical scene 161 captured by a camera 130-1 and microphone at the first machine 100-1 includes an image of user-1, which is displayed on the first display screen 110-1. (As explained more fully below, a physical scene and ZUI display elements displayed on a current presenter machine display screen 110-1 also are displayed on the current viewer machine display screens 110-2, 110-3.) In some embodiments, the display screens 110-1, 110-2, 110-3 may be coextensive with a ZUI viewing window. The field of view of the canvas encompassed by the display screen/viewing window (also referred to herein as 'display screen') determines which ZUI display elements may be displayed on the viewing window. As the canvas 500 moves relative to the display screen 110-1 (or vice versa), the ZUI display elements displayed on the display screen 110-1 change. It will be understood that although the ZUI display elements are disposed on the canvas 500, the canvas itself is not displayed on the display screen 110-1. The display screen 110-1 includes an offset region, which is a prioritized display region, within dashed lines 550 that is offset from an example prioritized scene region 552 in which designated portions of an image of user-1, such as the face may be displayed. In this example, the priority scene region 552 is located on a left side of the screen 110-1. The entire collection of display elements within the ZUI presentation are displayed on the display screen 110-1 at or about a center location 554 of the offset region 550. It is noted that only the text A display element of the first boundary display element 212 is legibly visible, since it is larger in size than the other display elements in the ZUI presentation. The text display elements of the other boundary display elements are too small to be legibly visible.

Figure 5B:
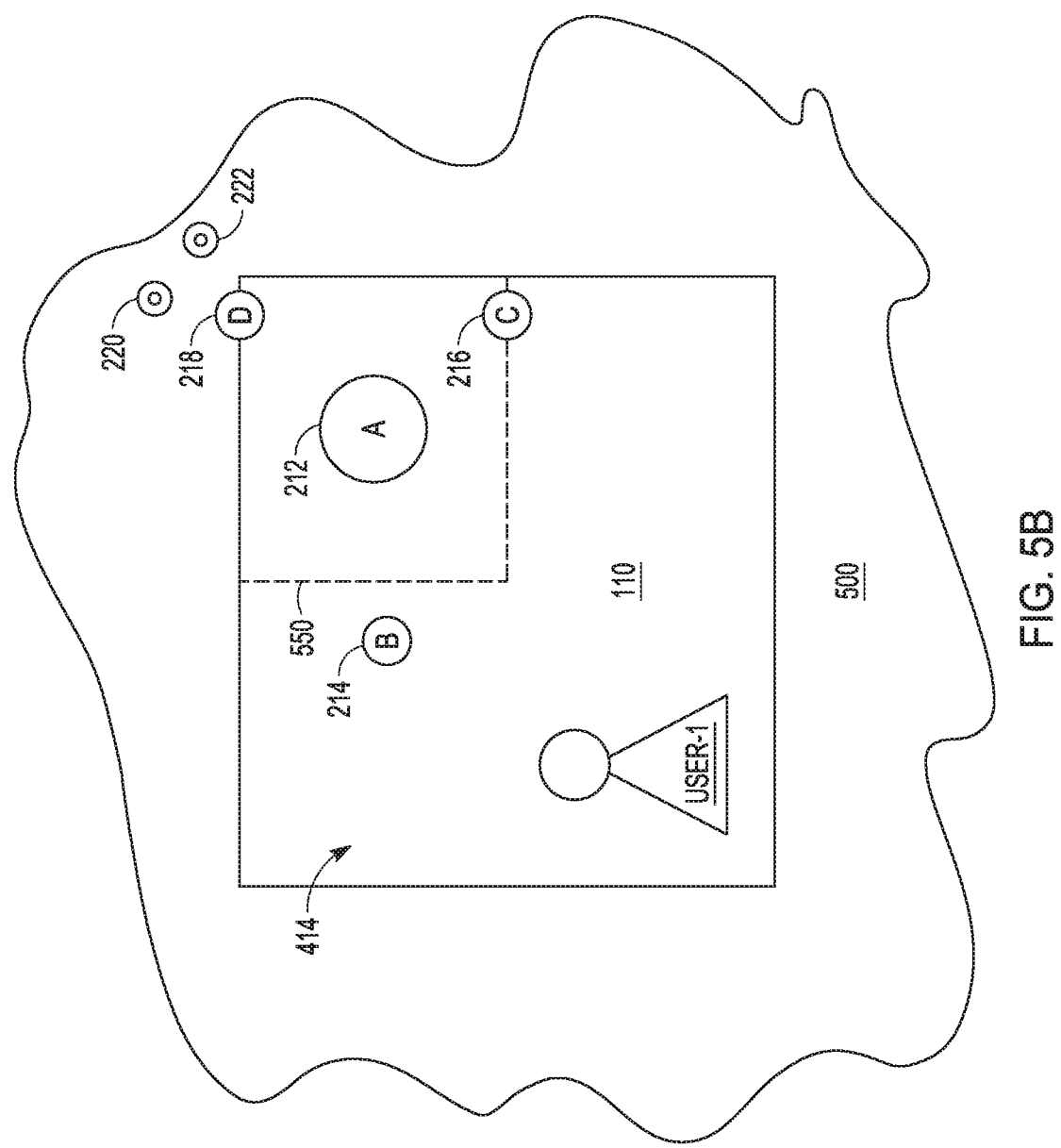

FIG. 5B is an illustrative drawing showing an image of user-1 and a ZUI image with focus on the first display element 212 containing text A during display of the target ZUI motion picture image 414 of FIG. 4 during a pause between times T1 and T2. Since user-1 is the presenter during the time interval between times T1 and T2, an image of user-1 is displayed on the display screen. A ZUI motion picture transition from previous target ZUI image 412 to new target ZUI image 414 involves ZUI images showing zooming in closer. The canvas 500 has moved relative to the screen display/viewing window 110-1 such that the first (largest size) first boundary display element 212 is located on the display screen 110-1 at about the center location 554 of the offset region 550, a prioritized display region. The second and third boundary display elements 214, 216 are located in whole on the display screen 110-1. The third boundary display element 218 is displayed in part on the display screen 110-1. Portions of the third and fourth boundary display elements 216, 218 are displayed on the display screen 110-1 within the offset region 550. The field of view within the display screen/viewing window 110-1 is zoomed in to a distance closer than the zoom level in FIG. 5A, such that the display element content, text A, of the first boundary display element 212 is easily legible to a viewer. The text A within the first boundary display element 212 is sized to be more easily legible than the smaller size texts C and D of the third and fourth boundary elements 216, 218. The fifth and sixth boundary display elements 220, 222 are disposed on a region of the canvas that is not within the field of view of the display screen 110-1 (which is coextensive with the viewing window)

Figure 5C:
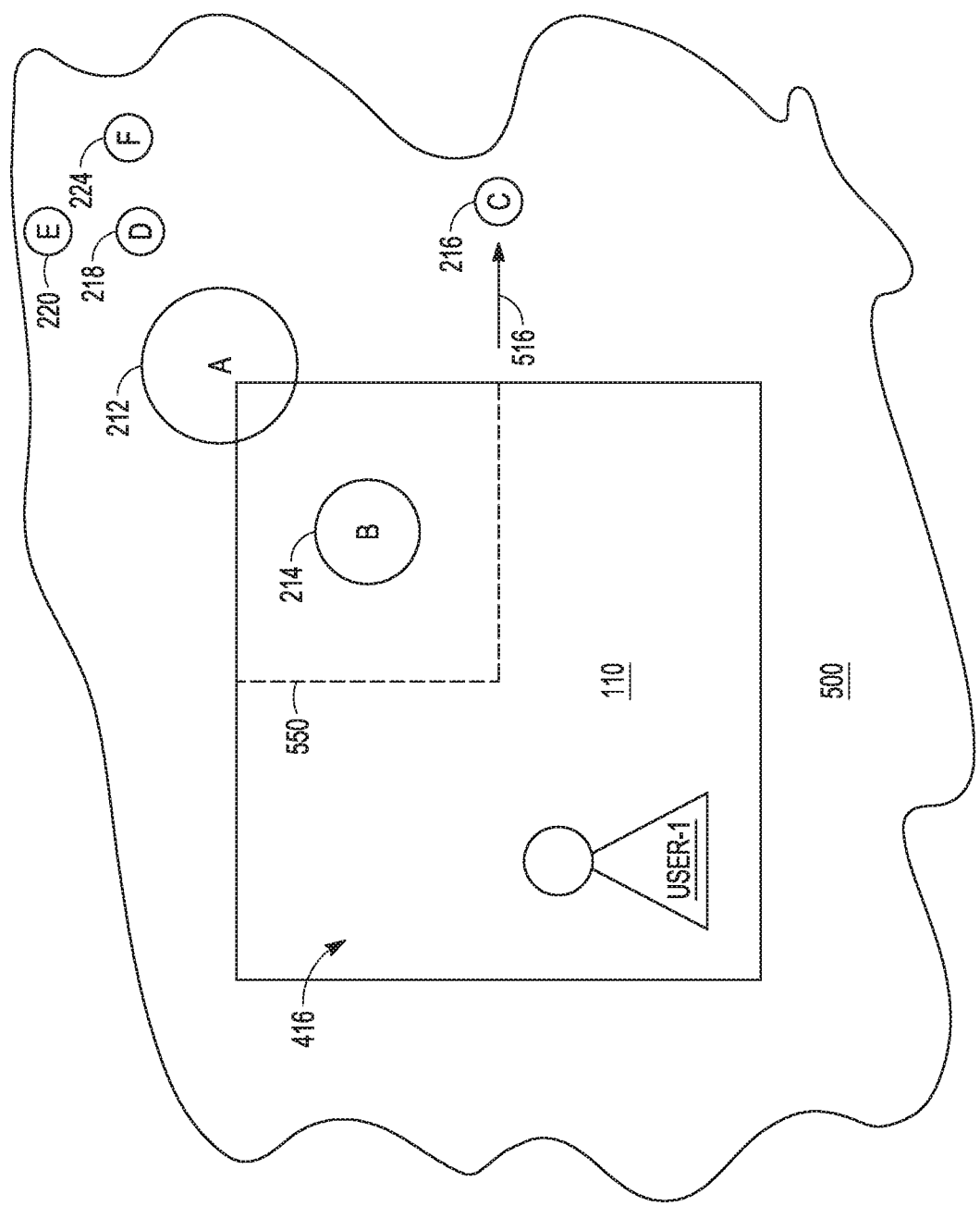

FIG. 5C is an illustrative drawing showing an image of user-1 and a ZUI image with focus on the second display element 214 containing text B during display of the target ZUI motion picture image 414 of FIG. 4 during a pause between times T2 and T3. Since user-1 is the presenter during the time interval between times T2 and T3, an image of user-1 is displayed on the display screen. A ZUI motion picture transition from previous target ZUI image 414 to new target ZUI image 416 involves ZUI images showing zooming in closer and panning in direction of arrow 516. The canvas 500 has moved relative to the screen display/viewing window 110-1 such that the second boundary display element 214 is located at about the center location 554 of the offset region 550. A portion of the first boundary display element 212 also is displayed on the screen 110-1 within the offset region 550. Since the second boundary display element 214 is smaller in size than the first boundary display element 212, the field of view within the display screen/viewing window 110-1 is zoomed in to a distance closer than the zoom level in FIG. 5B, such that the display element content, text B, of the second boundary display element 214 is easily legible to a viewer. None of the other boundary display elements on the canvas 500 is within the field of view of the display screen 110-1, and therefore none of them is visible on the display screen 110-1.

Figure 5D:
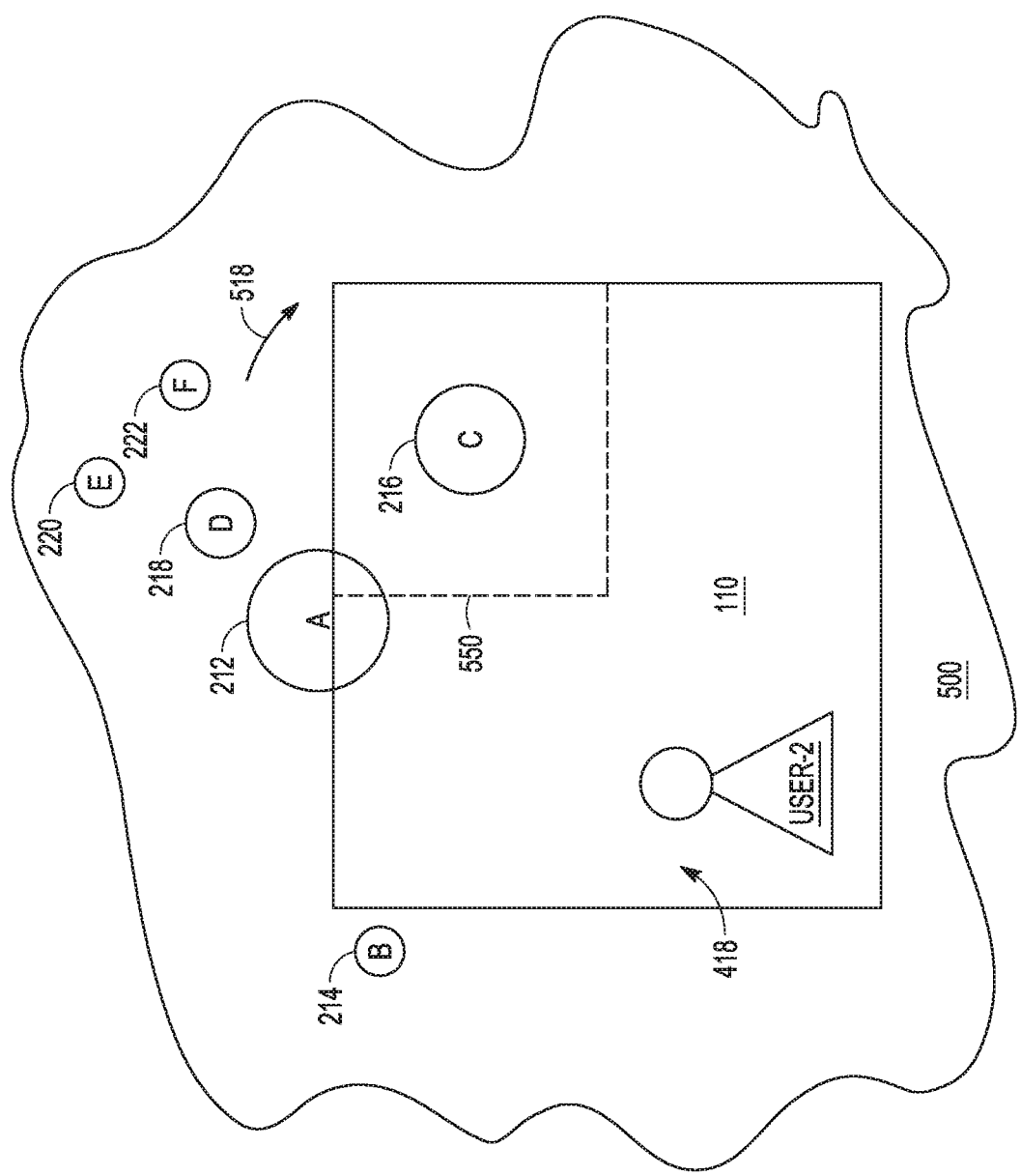

FIG. 5D is an illustrative drawing showing an image of user-2 and a ZUI image with focus on the third display element 216 containing text C during display of the target ZUI motion picture image 416 of FIG. 4 during a pause between times T3 and T4. Since user-2 is the presenter during the time interval between times T3 and T4, an image of user-2 is displayed on the display screen. A ZUI motion picture transition from previous target ZUI image 416 to new target ZUI image 418 involves images showing panning in direction of arrow 518. The canvas 500 has moved relative to the screen display/viewing window 110-2 such that the third boundary display element 216 is located at about the center location 554 of the offset region 550. A portion of the first boundary display element 212 also is displayed on the screen 110-2, partially within and partially outside the offset region 550. The field of view within the display screen/viewing window 110-2 is zoomed in to the same distance as the zoom level in FIG. 5C, since the second and third boundary display elements 214, 216 are the same size on the canvas 500, such that the display element content, text C, of the third boundary display element 216 is easily legible to a viewer. None of the other boundary display elements on the canvas 500 is within the field of view of the display screen 110-2, and therefore none of them is visible on the display screen 110-2.

Figure 5E:
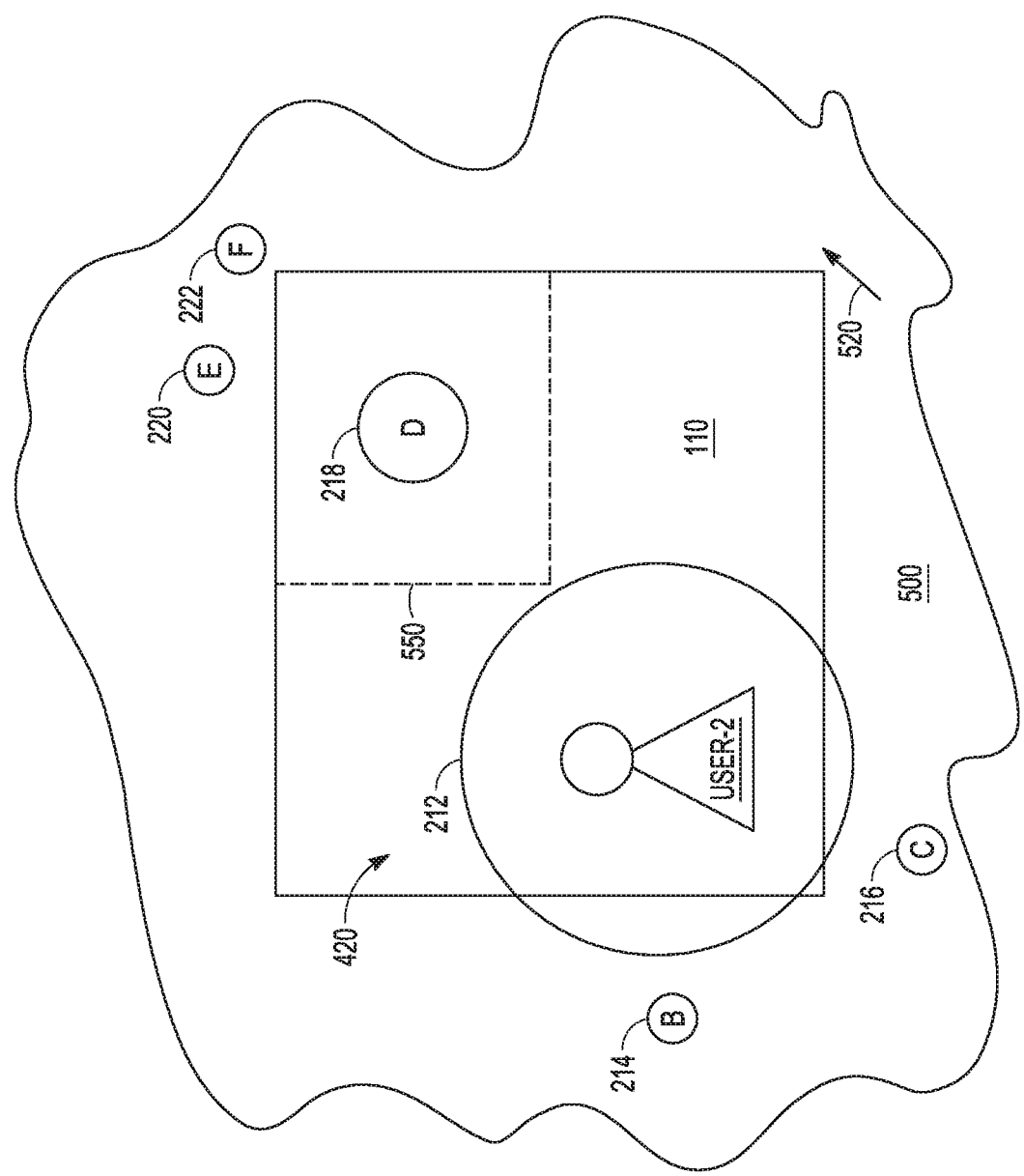

FIG. 5E is an illustrative drawing showing an image of user-2 and a ZUI image with focus on the fourth display element 218 containing text D during display of the target ZUI motion picture image 418 of FIG. 4 during a pause between times T4 and T5. Since user-2 is the presenter during the time interval between times T4 and T5, an image of user-2 is displayed on the display screen. A ZUI motion picture transition from previous target ZUI image 418 to new target ZUI image 420 involves images showing panning in direction of arrow 520. The canvas 500 has moved relative to the screen display/viewing window 110-2 such that the fourth boundary display element 218 is located at about the center location 554 of the offset region 550. A portion of the first boundary display element 212 also is displayed on the screen 110-2 outside the offset region 550. The first boundary display element 212 overlays the image of user-2. In some embodiments, the user-2 image has higher priority than the first display element 212 during compositing, and as a result, the user-2 image will be displayed and overlapping portions of the first display element 212 will be omitted. The field of view within the display screen/viewing window 110-2 is zoomed in to the same distance as the zoom level in FIGS. 5C-5D, since the second, third and fourth boundary display elements 214, 216, 218 are the same size on the canvas 500, such that the display element content, text D, of the fourth boundary display element 218 is easily legible to a viewer.

Figure 5F:
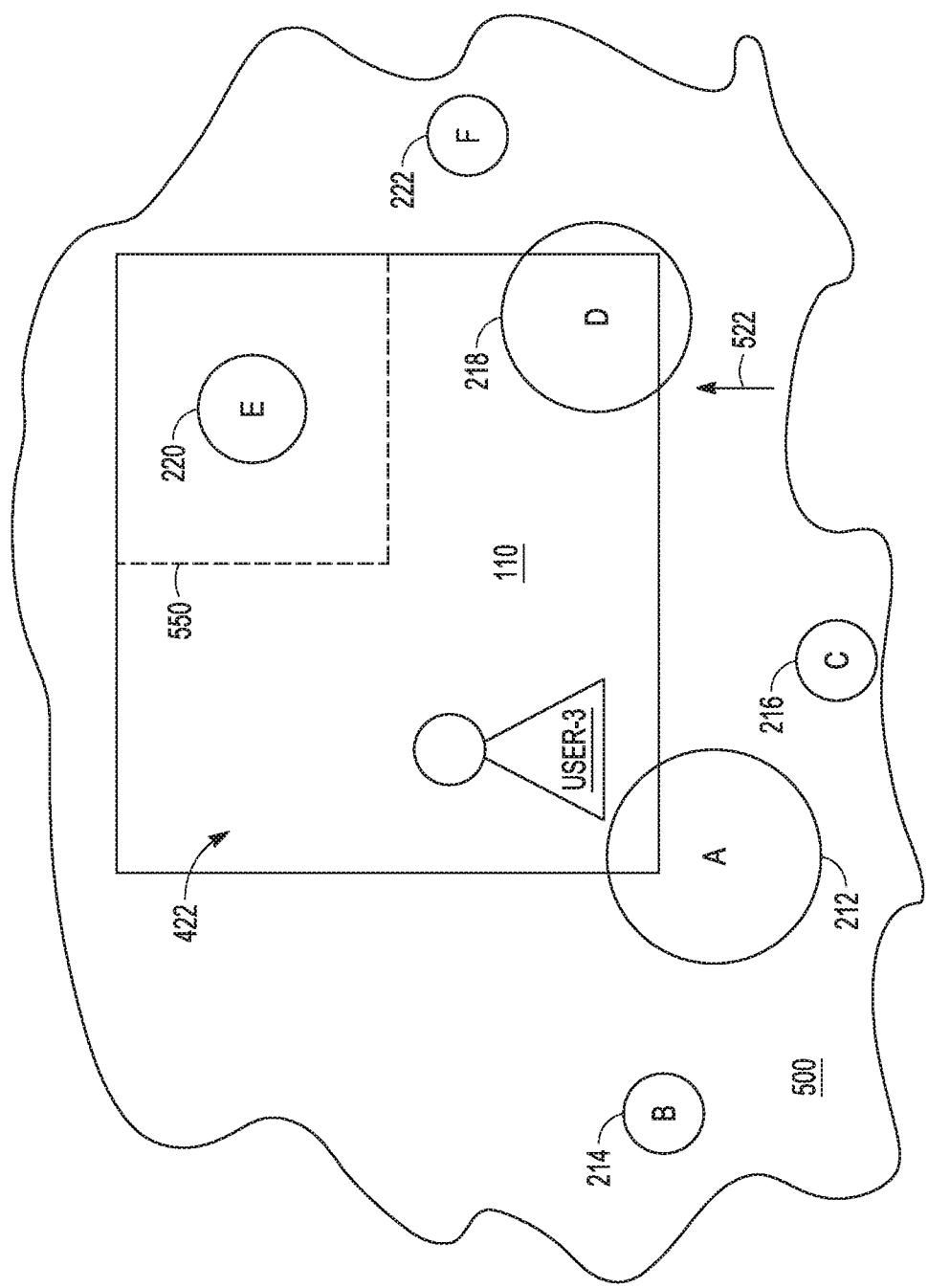

FIG. 5F is an illustrative drawing showing an image of user-3 and a ZUI image with focus on the fifth display element 220 containing text E during display of the target ZUI motion picture image 420 of FIG. 4 during a pause between times T5 and T6. Since user-3 is the presenter during the time interval between times T5 and T6, an image of user-3 is displayed on the display screen. A ZUI motion picture transition from previous target ZUI image 420 to new target ZUI image 422 involves images showing zooming in closer and panning in direction of arrow 522. The canvas 500 has moved relative to the screen display/viewing window 110-3 such that the fifth boundary display element 220 is located at about the center location 554 of the offset region 550. Portions of the first and fourth boundary display elements 212, 218 also are displayed on the screen 110-3 outside the offset region 550. Since the fifth boundary display element 220 is smaller in size than the second, third and fourth boundary display elements 214, 216, 218, the field of view within the display screen/viewing window 110-3 is zoomed in to a distance closer than the zoom levels in FIGS. 5B-5D, such that the display element content, text E, of the fifth boundary display element 220 is easily legible to a viewer.

Figure 5G:
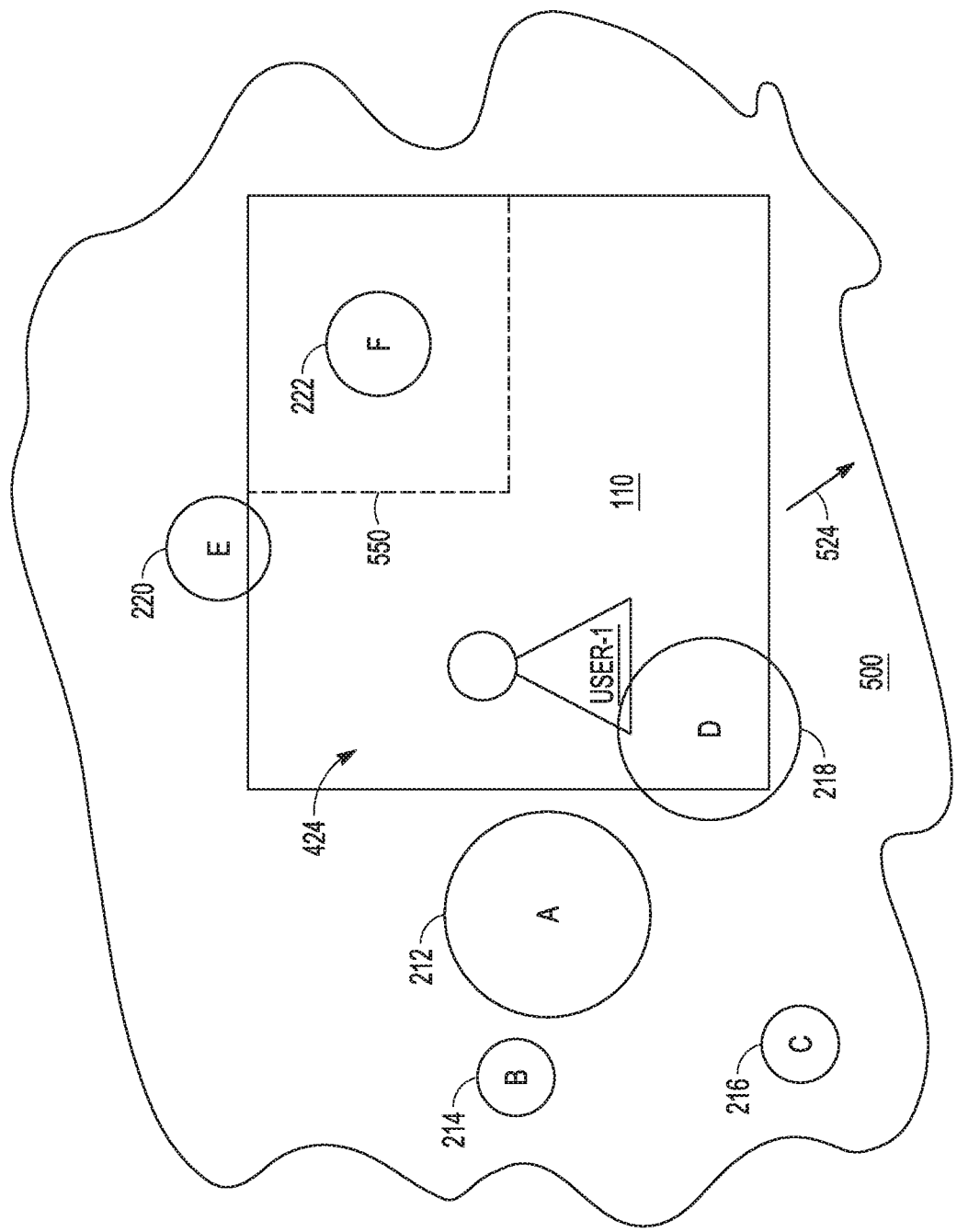

FIG. 5G is an illustrative drawing showing an image of user-1 and a ZUI image with focus on the sixth display element 222 containing text F during display of the target ZUI motion picture image 422 of FIG. 4 during a pause between times T6 and T7. Since user 1 is the presenter during the time interval between times T5 and T6, an image of user 1 is displayed on the display screen. A ZUI motion picture transition from previous target ZUI image 422 to new target ZUI image 424 involves images showing panning in direction of arrow 524. The canvas 500 has moved relative to the screen display/viewing window 110-1 such that the sixth boundary display element 222 is located at about the center location 554 of the offset region 550. Portions of the fourth and fifth boundary display elements 218, 220 also are displayed on the screen 110-1 outside the offset region 550. Since the sixth boundary display element 222 is the same size as the fifth boundary display element 220, the field of view within the display screen/viewing window 110-1 is zoomed to the same level as FIG. 5F, such that the display element content, text F, of the sixth boundary display element 222 is easily legible to a viewer.

Figure 5H:
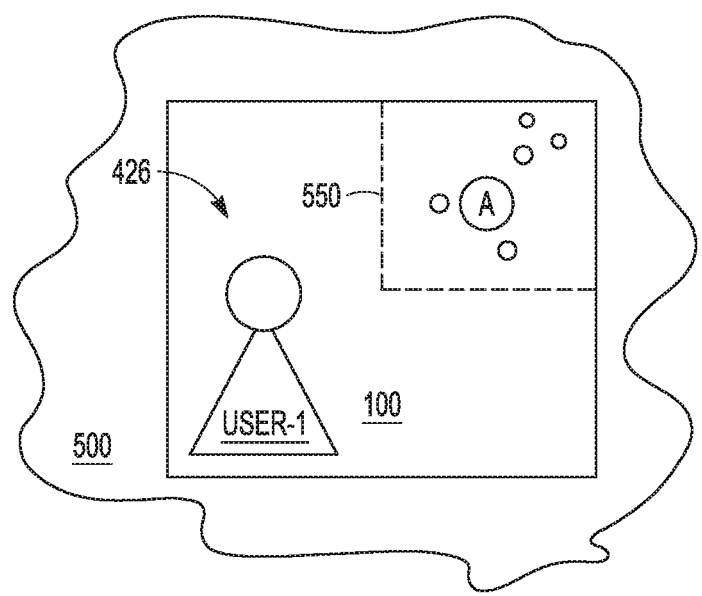

FIG. 5H is an illustrative drawing showing an image of user-1 and a ZUI image with focus on all display elements during display of the target ZUI motion picture image 424 of FIG. 4 during a pause between times T7 and T8. Since user-1 is the presenter during the time interval between times T7 and T8, an image of user-1 is displayed on the display screen. The canvas 500 has moved to the same position relative to the screen display/viewing window 110-1 as in FIG. 5A. The example presentation, therefore, ends where it began, with the entire collection of display elements within the ZUI presentation displayed on the display screen 110-1 at or about a center location 554 of the offset region 550.

Physical Scene Example

Figure 6:
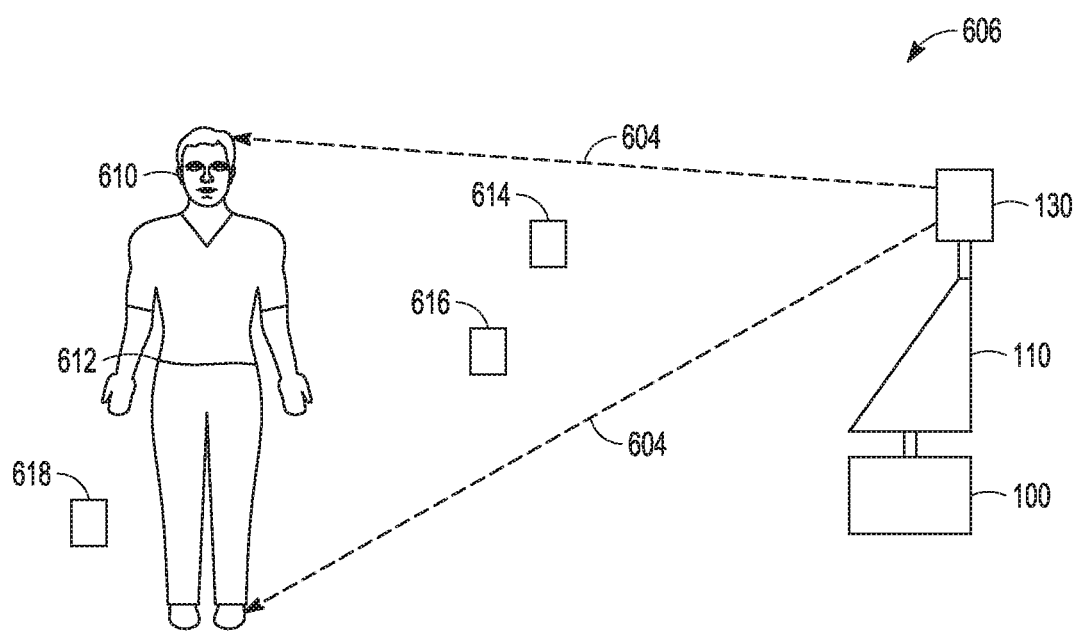
FIG. 6 is an illustrative drawing representing an arrangement of a motion picture camera to capture motion picture images of an example physical scene.

FIG. 6 is an illustrative drawing representing an arrangement of the first motion picture camera 130 associated with a roll-swapping machine 100 to capture motion picture image frames 604 of an example first physical scene 606, which may contain a user, when the machine is designated as the presenter machine. The camera 130 is coupled to the machine 100 to capture physical scene frames 604 for display on the display screen 110 and for sending the camera image frames to viewer machines when the machine 100 is designated as the presenter machine. The example physical scene 606 includes the face 610 of a user, which is a first object in the scene, user's body 612, which is a second object in the scene and may include a third, a fourth and a fifth object 614, 616, 618 that may provide background context for the scene. These other objects 614-618 may include furnishings such as tables and chairs if the scene is located inside a home or may include things of nature such as foliage and sky if the scene is located outside, for example.

Figure 7:
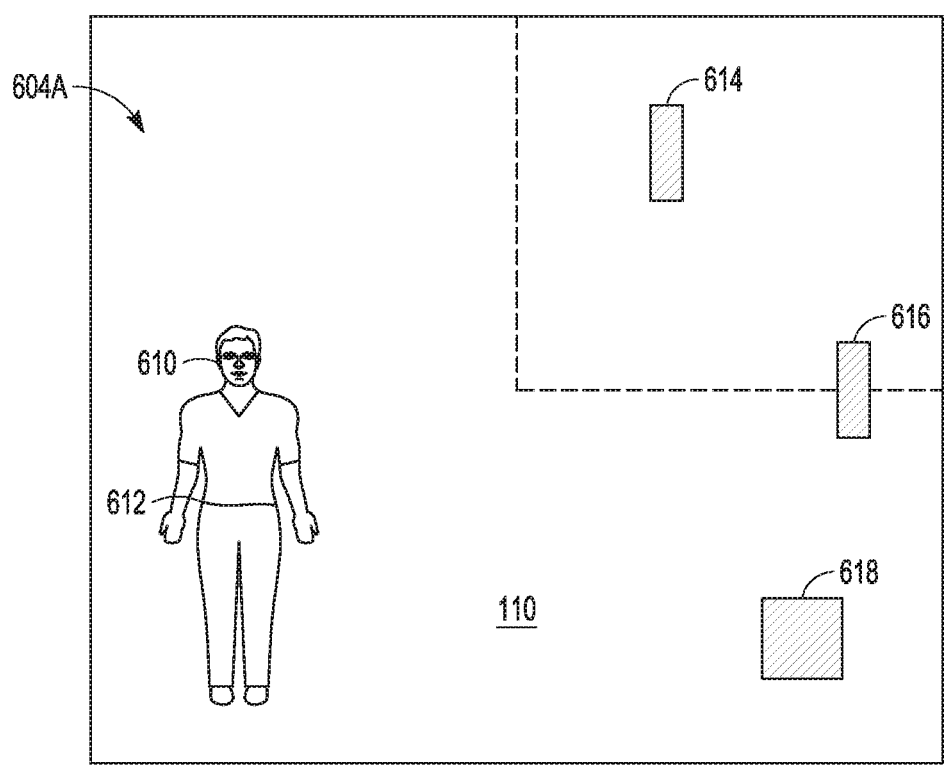
FIG. 7 is an illustrative drawing showing an example captured motion picture image frame displayed on the display screen.

FIG. 7 is an illustrative drawing showing an example individual captured motion picture image frame 604A displayed on the display screen 110. The person's face 610 and body 612 are disposed on the display screen 110 at a location outside of the offset region 550. A third object 614 is disposed within the offset region 550. The fourth object 616 is disposed partially within the offset region 550. The fifth object is disposed outside the offset region 550.

ZUI Command Index to Physical Scene Motion Picture Frames

In this example, the first machine 100-1 is designated as the presenter machine. In this example, the first machine 100-1 contemporaneously receives physical scene motion picture image information from the first camera 130-1 and receives ZUI commands provided by user-1 to a user interface. For example, a ZUI control input may include a scrollable menu (not shown) including thumb nail images of ZUI presentation's slides arranged along a side edge of a user's display screen. User-1 may select a thumb nail image (not shown) to cause the presentation to transition from its current slide display to display of a slide corresponding to the selected thumb nail image. Alternatively, for example, a ZUI control input may include Forward and Reverse (or right and left) control buttons on a display screen or on a hardware console (not shown). User-1 may select one of the buttons to advance the ZUI presentation from a currently displayed slide to a slide located before or after it in the ZUI presentation.

In some embodiments, the first machine 100-1 may include an image gesture sensor 136 that may be configured to act as a user interface to track and find the presenter's hands and/or fingers in the physical scene motion picture images. A presenter such as user-1, for example, may launch a ZUI command through a user interface gesture such as holding a hand and/or fingers behind a ZUI display element for a given time, e.g., two seconds, to select the display element, initiating a ZUI transition sequence to bring a different display element into focus. Alternatively, a user interface selection gesture may involve a swiping movement behind an image of a selected display element, for example. It will be appreciated that a presenter such as user-1, for example, can view both her own image including an image of her hand and/or fingers portrayed on the presenter's display screen together with the current ZUI display. Thus, the presenter, e.g., user-1, can readily discern when her hand and/or fingers are shown on the display screen to be disposed behind a ZUI display element in a manner so as to trigger a transition sequence. Moreover, (non-presenter) viewers also can observe the presenter's hand and/or finger movements to discern which display element the presenter selects to trigger a transition sequence. Thus, a presenter and viewer both receive visual feedback as to the presenter's gestures to select ZUI display elements so that both can more readily understand the flow of the ZUI presentation.

Figure 8:
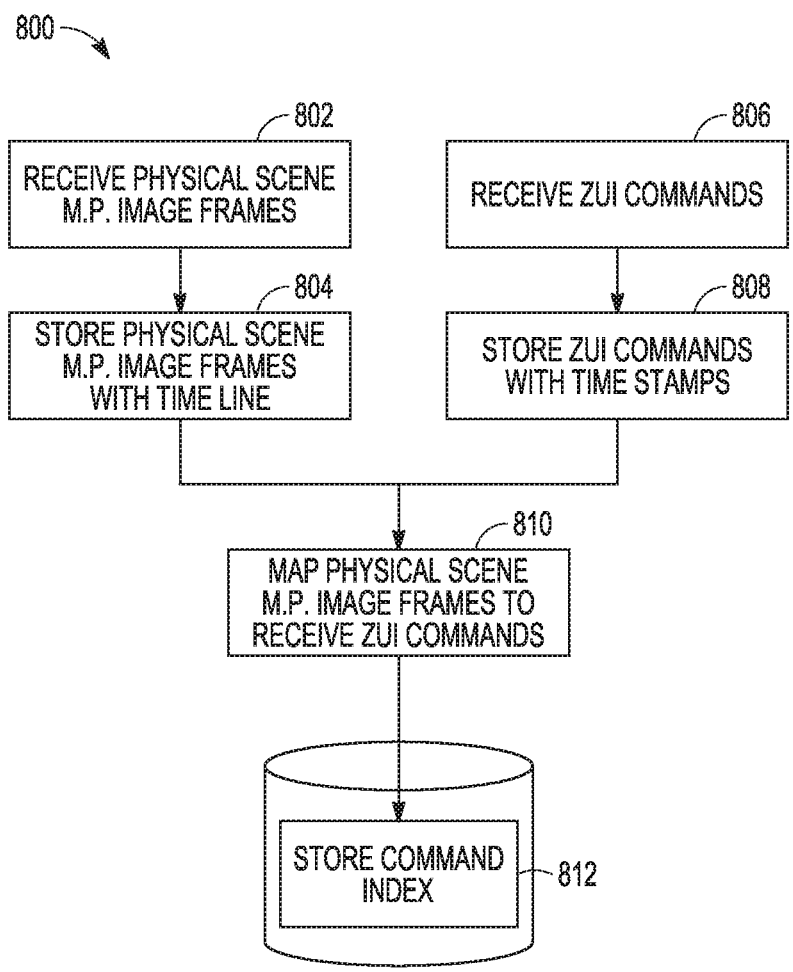
FIG. 8 is an illustrative flow diagram representing a process to produce a ZUI command index to a physical scene motion picture sequence.

FIG. 8 is an illustrative flow diagram representing a process 800 to produce a ZUI command index 904 to a physical scene motion picture sequence. In accordance with some embodiments, a machine configured to act as a presenter machine may be configured to produce a command index. Different machines may act as presenter machines at different times, and therefore, different portions of the index may be produced by different machines. Moreover, the index may be segmented into different portions created by different machines. As explained more fully below, the command index segments may be transmitted to viewer machines together with physical scene motion picture images captured contemporaneously with the creation of the command index so that the viewer machines may display the same physical scene motion picture images captured by the presenter machine composited with ZUI presentation images matching those displayed by the presenter machine at the time the physical scene motion picture images were captured.

To simplify the explanation, the following assumes that the first machine 100-1 is configured as the presenter machine. However, as explained above with reference to FIG. 4, the example first, second, and third machines 100-1, 100-2, 100-3 may take turns acting as a presenter machine. Thus, it will be appreciated that the second and third machines 100-2, 100-3 operate similarly when configured as the presenter machine. Continuing with the discussion of FIG. 8, The computer program instructions 124 include instructions to control creation of the ZUI command index 904. Block 802 represents the current presenter machine receiving physical scene frames at the data interface 119, captured by a camera associated with the current presenter machine. Block 804 represents the presenter machine storing the physical scene frames, with a frame timeline, at the storage device 116. Block 806 represents the presenter machine receiving at the data interface 119 or a user interface, ZUI commands to cause the display of ZUI presentation transitions and corresponding pauses. Block 808 represents the presenter machine storing the received ZUI commands, with timestamps, at the storage device 116. It will be appreciated that the time stamps pertain to a reference time for the physical frame sequence captured at the current presenter machine. Different presenter machines may use different reference times for their timestamps. Block 810 represents the CPU 102 of the current presenter machine mapping ZUI commands to physical scene motion picture image information to produce a ZUI command index 904 shown in FIG. 9. The mapping involves matching timepoints of the physical scene timeline to time stamps associated with the ZUI commands based upon a reference time used by the current presenter machine. Block 812 stores the ZUI command index 904 in the at the storage device 116.

Figure 9:
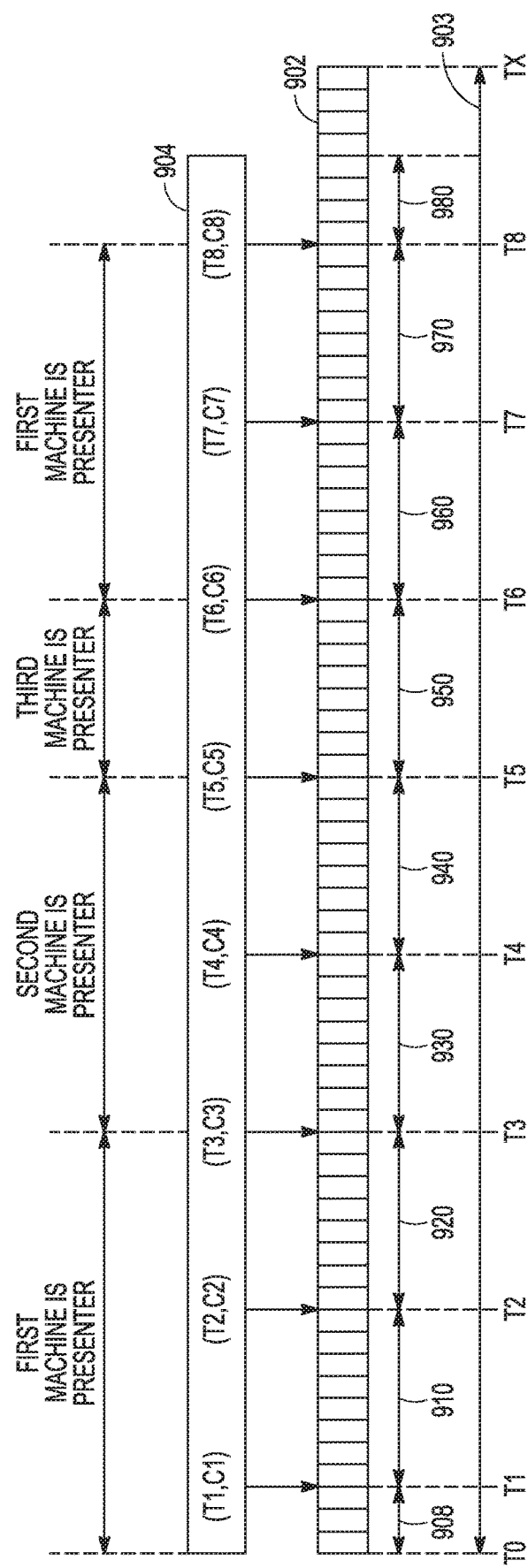
FIG. 9 is an illustrative drawing representing example physical scene motion picture image sequence and associated ZUI presentation command index.

FIG. 9 is an illustrative drawing representing example physical scene motion picture image sequence 902 and associated ZUI command index 904 containing segments produced by the first, second, and third machines 100-1, 100-2, 100-3 when acting as presenter machine. The physical scene motion picture image and sound frame sequence 902 may be displayed on the display screens of presenter and viewer computers contemporaneously with corresponding ZUI presentation motion picture images 402. Motion picture image and sound frames may be referred to herein as 'physical scene frames'. A timeline 906, which extends from T0 at the beginning of the physical scene frame sequence 902 to TX at the end of the physical scene frame sequence 902, indexes the physical scene motion picture image sequence 902. In other words, the timeline 906 may be associated with a physical scene frame sequence 902, and individual physical scene frames 902 may be associated with timepoints on the timeline 906. The ZUI command index 904 includes ZUI commands C1-C8 associated with timepoints T1-T8 on the timeline 906. More particularly, the ZUI presentation index 904 associates each ZUI command received by the computer system 100 during recording of the physical scene motion picture images with a timepoint associated with one or more physical scene images recorded at or about the timepoint when the command was received. Thus, the ZUI presentation index 904 acts to synchronize the physical scene motion picture image sequence 902 with a ZUI presentation motion picture images 402 that are displayed together on the display screen 110 at the time of recording of the physical scene 606.

Referring to FIG. 9, a physical scene motion picture image sequence 902 starts at time T0. Referring to FIG. 4, at time T0 while the first machine 100-1 is designated as the presentation machine, the first camera 130-1 and first microphone 132-1 of the first machine begin to capture and time stamp first physical scene frames (motion picture image frames and sound frames) 909 representing a first physical scene 161 at the first machine 100-1, which may include images and sounds representing user-1. The captured physical scene frames may be buffered in storage at the first machine. At or about time T0, the first machine 100-1 begins to transmit the first physical frames 909 over the network to the second and third machines 100-2, 100-3, which act as viewer machines. The first, second and third machines 100-1, 100-2, 100-3 use the first physical frames 909 to display images and sounds from the first physical scene starting at or about time T0.

At time T1, while the first machine 100-1 acts as the presenter machine and while the first machine continues to capture, times tamp and transmit physical scene frames 909 representing the first physical scene, user-1 provides a first user input command C1, which is received at the first machine 100-1 to initiate the first ZUI transition motion picture images 411, during the capture of physical scene frames 910, which precedes the first paused ZUI motion picture image 412. Referring to FIG. 8, in response to receipt of the first command C1, the first machine 100-1 adds the first command C1 to a ZUI presentation index 904 to associate one or more physical scene frames captured at the first machine at or about time T1 of the timeline 906 with the first command C1 to produce a first command, timepoint pair (C1, T1). At or about time T1, the first machine 100-1 also sends the first command timepoint pair (C1, T1) over the network 150 to the second and third machines 100-2, 100-3, which continue to act as viewer machines. During time interval T1 to T2, the first machine 100-1 captures time stamps and buffers physical scene frames 910, and sends them over the network 150 to the second and third machines. The first, second and third machines 100-1, 100-2, 100-3 composite the first physical scene frames and the second physical scene frames captured by the first machine with ZUI transition frames 411 and the first paused ZUI motion picture image 412 corresponding to the first command C1. The first command timepoint pair (C1, T1) may be used to align first physical scene frames 920 received during the time interval T1 to T2 with the ZUI motion picture frames 411, 412.

At time T2, while the first machine 100-1 continues to capture, time stamp and transmit first physical scene frames 920, user-1 provides a second user input command C2, which is received at the first machine to initiate display of second ZUI transition motion picture images 413 and second paused ZUI motion picture image 414 during a time interval T2 to T3 while the first machine captures first physical scene frames 920. Referring to FIG. 8, in response to receipt of the second command C2, the first machine 100-1 adds the second command C2 to the ZUI presentation index 904 to associate one or more physical scene frames captured at the first machine 100-1 at or about time T2 of the timeline 906 with the second command C2 to produce a second command, timepoint pair (C2, T2). At or about time T2, the first machine 100-1 also sends the second command timepoint pair (C2, T2) to the second and third machines, which continue to act as viewer machines. During time interval T2 to T3, the first machine 100-1 captures, time stamps and buffers first physical scene frames 920, and sends them over the network 150 to the second and third machines 100-2, 100-3. The first, second and third machines 100-1, 100-2, 100-3 composite physical scene frames 920 captured by the first machine 100-1 with ZUI transition frames 413 and the first paused ZUI motion picture image 414 corresponding to the second command C2. The second command timepoint pair (C2, T2) may be used to align the first physical scene frames 909, 910 received during time interval T2 to T3 with the ZUI motion picture frames 413, 414. Thus, it will be appreciated that the first machine 100-1 produces a first segment of the ZUI presentation index 904 that extends between time T0 and T3; it will be appreciated that timestamps used by the first machine 100-1 may use a time reference local to the first machine 100-1.

At or about time T3, the second machine 100-2 transitions to act as the presenter machine and the first machine 100-1 transitions to act as a viewer machine. The second machine 100-2 captures and time stamps second physical scene frames 930 and transmits them to the first and third machines 100-1, 100-3. At about time T3, user-2 provides a third user input command C3, which is received at the second machine 100-2 to initiate display of third ZUI transition motion picture images 415 and third paused ZUI motion picture image 416 during a time interval T3 to T4 while the second machine captures second physical scene frames 930. Referring to FIG. 8, in response to receipt of the third command C3, the second machine 100-2 adds the third command C3 to the ZUI presentation index 904 to associate one or more physical scene frames captured at the second machine 100-2 at or about time T3 of the timeline 906 with the third command C3 to produce a third command, timepoint pair (C3, T3). At or about time T3, the second machine also sends the third command timepoint pair (C3, T3) to the first and third machines, which continue to act as viewer machines. During time interval T3 to T4, the second machine 100-2 captures and buffers second physical scene frames 930, and sends them over the network 150 to the first and third machines 100-1, 100-3. The first, second and third machines 100-1, 100-2, 100-3 composite second physical scene frames 930 captured by the second machine with ZUI transition frames 415 and the third paused ZUI motion picture image 416 corresponding to the third command C3. The third command timepoint pair (C3, T3) may be used to align the second physical scene frames 930 received during time interval T3 to T4 with the ZUI motion picture frames 415, 416.

Similarly, at time T4, while the second machine 100-2 continues to capture, time stamps and transmit second physical scene frames 920, user-2 provides a fourth user input command C4, which is received at the second machine 100-2 to initiate display of fourth ZUI transition motion picture images 417 and second paused ZUI motion picture image 418 during a time interval T4 to T5 while the second machine 100-2 captures second physical scene frames 940. In a manner similar to that described above, during time interval T4 to T5, the second machine 100-2 captures and buffers second physical scene frames 940, and sends them over the network 150 to the first and third machines 100-1, 100-3. The first, second and third machines 100-1, 100-2, 100-3 composite second physical scene frames 940 captured by the second machine 100-2 with ZUI transition frames 417 and the fourth paused ZUI motion picture image 418 corresponding to the fourth command C4. The fourth command timepoint pair (C4, T4) may be used to align the second physical scene frames 940 received during time interval T4 to T5 with the ZUI motion picture frames 417, 418. Thus, it will be appreciated that the second machine 100-2 produces a second segment of the ZUI presentation index 904 that extends between time T3 and T5; it will be appreciated that timestamps used by the second machine 100-2 may use a time reference local to the second machine 100-2.

At or about time T5, the third machine 100-3 transitions to act as the presenter machine and the second machine 100-2 transitions to act as a viewer machine. At time T5, while the third machine 100-3 captures, time stamps and transmits third physical scene frames 950, user-3 provides a fifth user input command C5, which is received at the third machine 100-3 to initiate display of fifth ZUI transition motion picture images 419 and fifth paused ZUI motion picture image 420 during a time interval T5 to T6 while the third machine 100-3 captures third physical scene frames 940. In a manner similar to that described above, during time interval T5 to T6, the third machine 100-3 captures and buffers third physical scene frames 950, and sends them over the network 150 to the first and second machines 100-1, 100-2. The first, second and third machines 100-1, 100-2, 100-3 composite third physical scene frames 950 captured by the third machine 100-3 with ZUI transition frames 419 and the fifth paused ZUI motion picture image 420 corresponding to the fifth command C5. The fifth command timepoint pair (C5, T5) may be used to align the third physical scene frames 950 received during time interval T5 to T6 with the ZUI motion picture frames 419, 420.

At or about time T6, the first machine 100-1 transitions to act as the presenter machine and the third machine 100-3 transitions to act as a viewer machine. At time T6, while the first machine 100-1 captures, time stamps and transmits first physical scene frames 9650, user-1 provides a sixth user input command C6, which is received at the first machine 100-1 to initiate display of sixth ZUI transition motion picture images 421 and sixth paused ZUI motion picture image 422 during a time interval T6 to T7 while the first machine 100-1 captures first physical scene frames 960. In a manner similar to that described above, during time interval T6 to T7, the first machine 100-1 captures and buffers first physical scene frames 960, and sends them over the network 150 to the second and third machines 100-2, 100-3. The first, second and third machines 100-1, 100-2, 100-3 composite first physical scene frames 960 captured by the first machine 100-1 with ZUI transition frames 421 and the fifth paused ZUI motion picture image 422 corresponding to the sixth command C6. The sixth command timepoint pair (C6, T6) may be used to align the first physical scene frames 960 received during time interval T6 to T7 with the ZUI motion picture frames 421, 422.

Similarly, at time T7, while the first machine 100-1 continues to capture, time stamp and transmit first physical scene frames 960, user-1 provides a seventh user input command C7, which is received at the first machine 100-1 to initiate display of seventh ZUI transition motion picture images 423 and seventh paused ZUI motion picture image 424 during a time interval T7 to T8 while the first machine captures first physical scene frames 970. In a manner similar to that described above, during time interval T6 to T7, the first machine 100-1 captures and buffers first physical scene frames 970, and sends them over the network 150 to the second and third machines 100-2, 100-3. The first, second and third machines 100-1, 100-2, 100-3 composite first physical scene frames 970 captured by the first machine 100-1 with ZUI transition frames 423 and the seventh paused ZUI motion picture image 424 corresponding to the seventh command C7. The seventh command timepoint pair (C7, T7) may be used to align the first physical scene frames 970 received during time interval T7 to T8 with the ZUI motion picture frames 423, 424.

Determining Priority Scene Region and Offset Region

Figure 10:
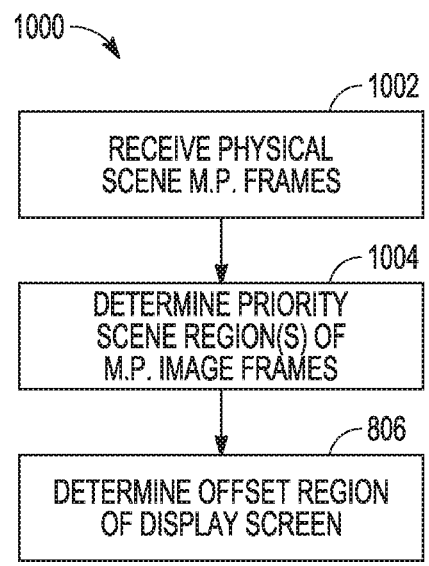
FIG. 10 is an illustrative flow diagram representing a process to determine prioritization and offset location of ZUI display elements.
Figure 11:
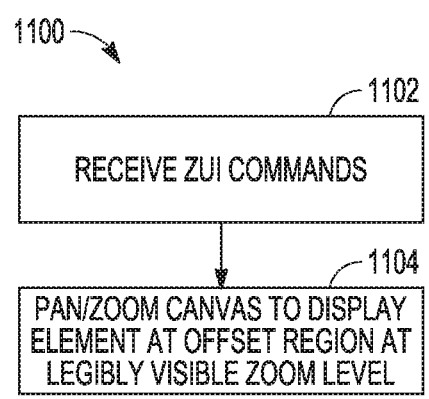
FIG. 11 is an illustrative flow diagram representing a process to pan and/or zoom to an offset location in response to a ZUI command.

FIG. 10 is an illustrative flow diagram representing a process 1000 to determine prioritization and target offset location of ZUI display elements. The computer program instructions 124 include instructions to instruct a machine 100 to control scene prioritization and ZUI offset. Each of the first, second and third example machines may be configured according to instructions 124 to control scene prioritization and ZUI offset. Block 1002 represents the machine 100 receiving a sequence of physical scene motion picture frames. Block 1004 represents the machine 100 determining a display screen location of a priority region of the received physical scene motion picture frames. A priority scene region 552 may be determined based upon an image recognition process using image sensor 136, which may involve pattern recognition such as facial and/or hand recognition, for example. In accordance with some embodiments, a priority scene region may be a display screen region in which user-1, user-2 and user-3 are displayed. Alternatively, a priority scene region may be a predetermined display screen region such as the left or right side of the display screen 110, where user-1, user-2 and user-3 are to be displayed, for example. Block 1006 represents the computer system 100 determining location of an offset region 550 on the display screen 110 where target display elements will be displayed during ZUI pauses. The offset region 550 may be a predetermined region of the display screen 110 such as an upper right corner of the display screen, for example. Alternatively, the offset region may be determined based upon a determined display screen location of a priority scene region. Specifically, a location on the display screen 110 of an offset region in which a target display element is displayed during a ZUI pause, may be selected to be spaced apart from a determined display screen location of a priority scene region so that the priority scene region and a display element within the offset region do not overlap or to at least minimally overlap. In other words, the offset region may be selected so as to be offset from a screen location where a currently displayed user-1, user-2 or user-3 is displayed Panning and/or Zooming to an Offset Screen Location FIG. 11 is an illustrative flow diagram representing a process 1100 to pan and/or zoom to an offset location in response to a ZUI command. The computer program instructions 124 include ZUI instructions to instruct machine 100 to control pan/zoom to an offset location. Each of the first, second and third example machines may be configured according to instructions 124 to pan and/or zoom to an offset location in response to a ZUI command. Block 1102 represents the machine 100 receiving at the data interface 119 or a user interface, a ZUI command to pan and/or zoom from a current display element to a target display element. Block 1104 represents the machine 100 causing panning and/or zooming of the canvas 500 to display the target display element within an offset region that is offset far enough from a priority scene location to not overlap it when the target display element is paused while zoomed to a legibly visible zoom level.

Compositing ZUI Motion Picture Images and Physical Scene Motion Picture Images

Figure 12:
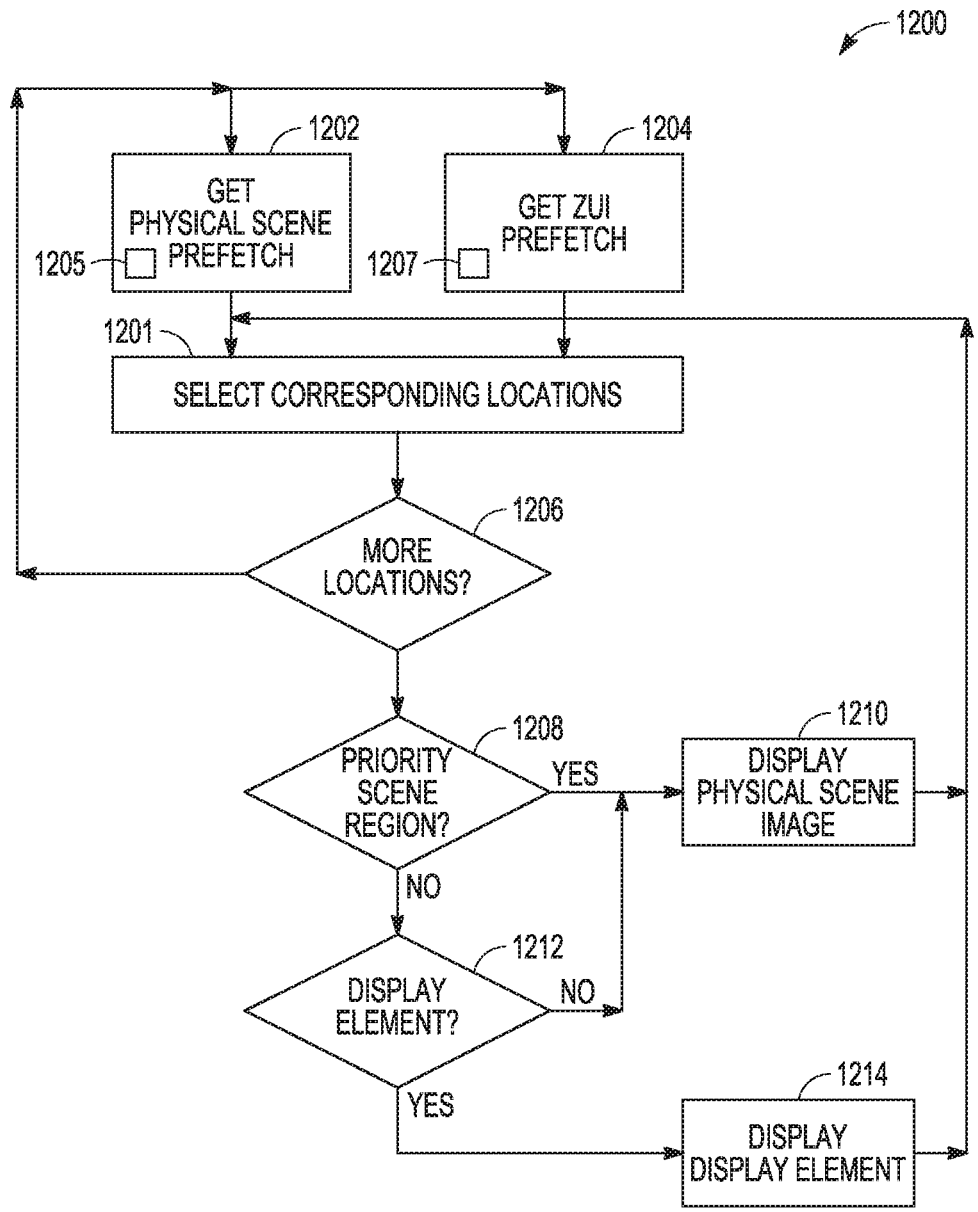
FIG. 12 is an illustrative flow diagram representing a process to composite physical scene motion picture frames and ZUI motion picture frames.

FIG. 12 is an illustrative flow diagram representing a process 1200 to composite physical scene motion picture frames and ZUI motion picture frames. The computer program instructions 124 include compositing instructions to instruct machine 100 to composite physical scene motion picture frames and ZUI motion picture frames. Each of the first, second and third example machines 100-1, 100-2, 100-3 of FIG. 1B may be configured according to instructions 124 to composite physical scene motion picture frames and ZUI motion picture frames. The physical scene motion picture frames are captured by a presenter machine and sent to the viewer machines. The ZUI motion picture frames are determined by a navigation commands received at a presenter machine contemporaneous with the captured physical scene motion picture frames with which they are to be composited. Both the presenter machine and the viewer machines may be configured to use the process 1200 to composite physical scene motion picture frames and ZUI motion picture frames.

At block 1202 the CPU 102 gets a next physical scene motion picture sequence frame in a first prefetch frame buffer portion 1205 of the storage device 116. The physical scene motion picture frames are received at the data interface 119 from the camera 602 during recording of the scene and are called up from the storage device 116 during physical scene playback. At block 1204 the CPU 102 gets a next ZUI presentation motion picture sequence frame in a in a second prefetch frame buffer portion 1207 of the storage device 116. Block 1201 represents the CPU 102 selecting corresponding display screen locations of the first and second prefetch frame buffers 1205, 1207 such as corresponding screen display pixel locations. Decision block 1206 represents determining whether there are more locations of the selected frame to evaluate. If no, then control flows back to blocks 1202 and 1204 and a next physical scene motion picture sequence frame is gotten in the first prefetch frame buffer 1205 and a next ZUI presentation motion picture sequence frame is gotten in the second prefetch frame buffer portion 1207. If no, then in decision block 1208, the CPU 102 determines whether the first prefetch buffer 1205 contains image information representing a prioritized scene region. If yes, then at block 1210, the CPU 102 uses display information, such as a pixel value, at the selected location within the first prefetch buffer 1205 to produce a portion of the image on the display screen at a corresponding location on the display screen 110. If no, then at decision block 1212, the CPU determines whether the second prefetch buffer 1207 contains image information representing a display element. If no, then control flows to block 1210, and the CPU 102 uses display information at the selected location within the first prefetch buffer 1205 to produce a portion of the image on the display screen at a corresponding location on the display screen 110. If yes, then the CPU 102 uses display information, such as a pixel value, at the selected location within the second prefetch buffer 1205 to produce a portion of the image on the display screen at a corresponding location on the display screen 110. Following block 1210 or 1214, whichever is invoked during the cycle, control flows back to block 1206, which selects a next corresponding display screen location of the first and second prefetch frame buffers 1205, 1207.

Composited ZUI Presentation Physical Scene Examples

Figure 13A:
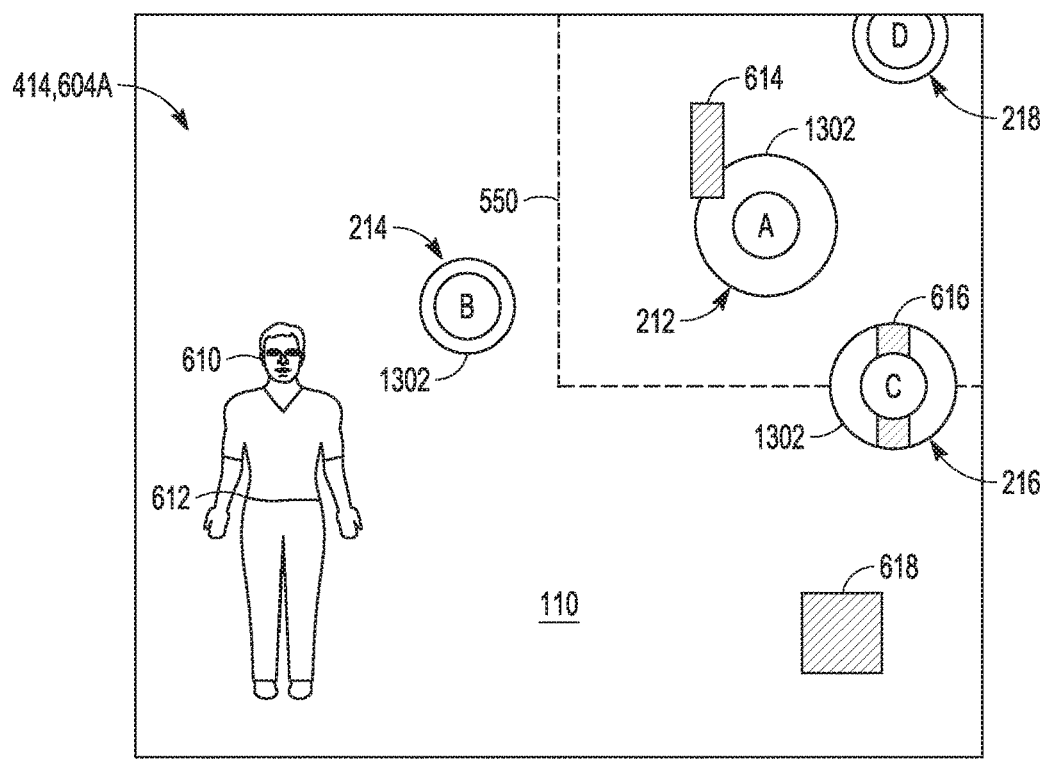
FIGS. 13A-13C are illustrative drawings showing example compositing of ZUI presentation frames and physical scene frames based upon prioritization and offset rules.
Figure 13B:
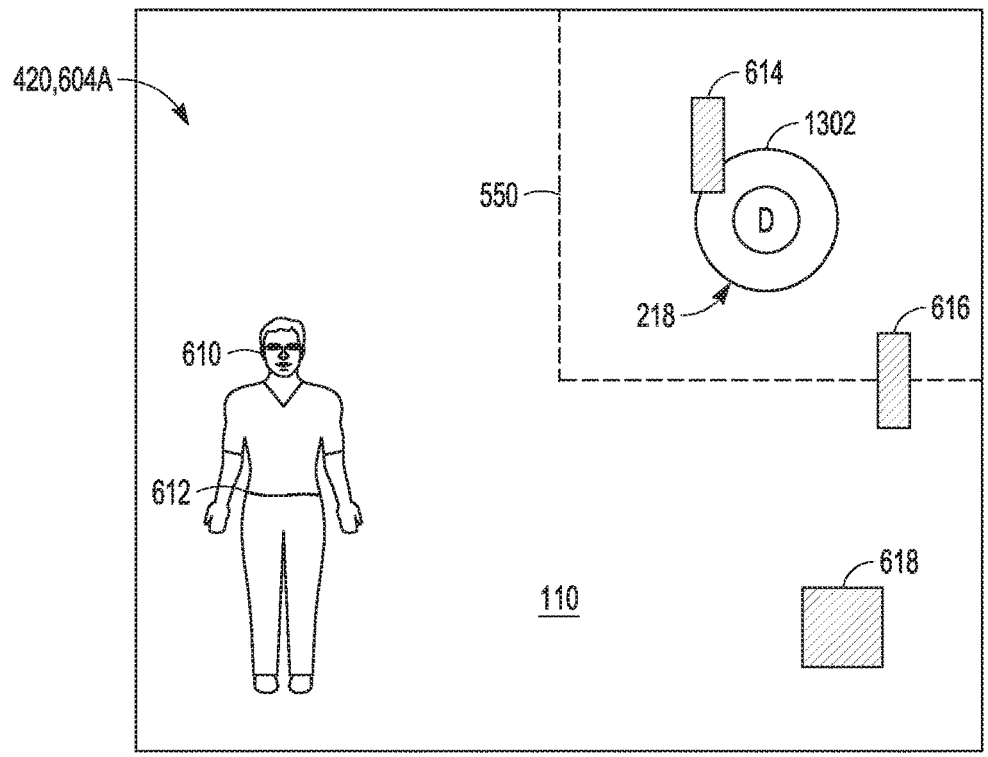
Figure 13C:
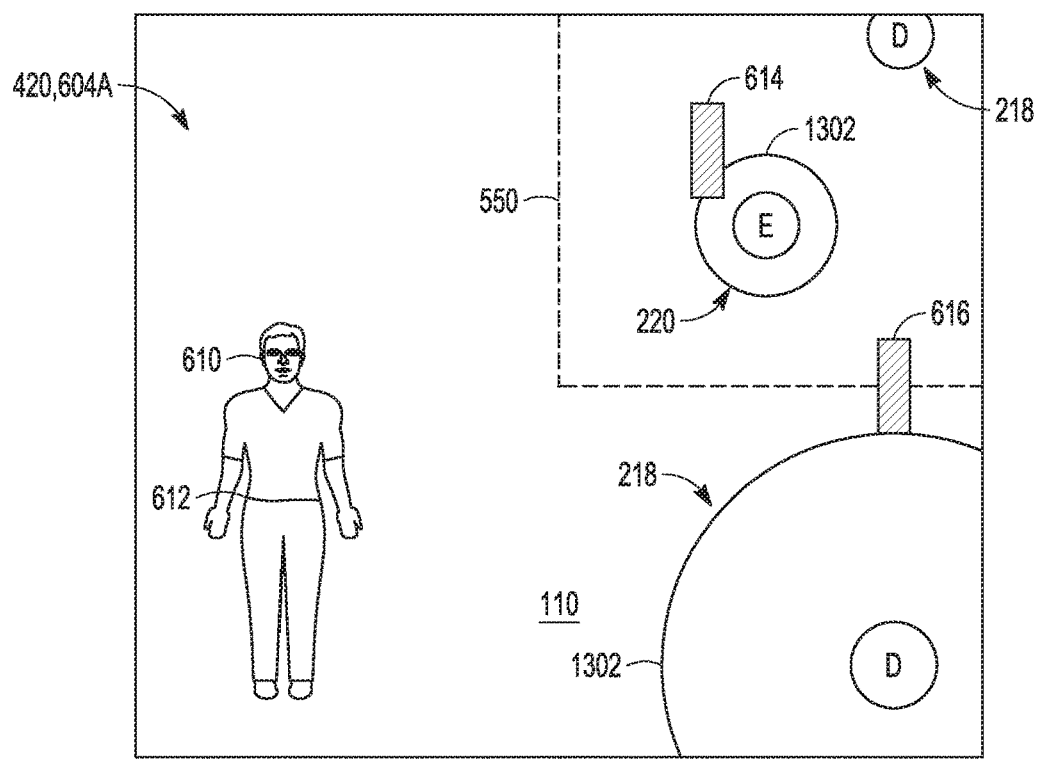

FIGS. 13A-13C are illustrative drawings showing example compositing of and physical scene frames and ZUI presentation frames based upon prioritization and offset rules. FIG. 13A is an illustrative drawing representing compositing of the second paused ZUI motion picture image 414 of FIG. 5B and the individual captured motion picture image frame 604A of FIG. 7. The boundary display elements 212, 214, 216, 218 are transparent except for their outer perimeters 1302 and their text display element regions. A portion of the third object 614 is shown visible within the perimeter 1302 of the first boundary display element 212. A portion of the fourth object 616 is shown visible within the perimeter 1302 of the third boundary display element 216. However, the text C of the third boundary display element 216 overlays and obscures another portion of the fourth object 616 since, in this example, the fourth object 616 is not a prioritized as a priority scene region.

FIG. 13B is an illustrative drawing representing compositing of the fifth paused ZUI motion picture image 420 of FIG. 5E and the individual captured motion picture image frame 604A of FIG. 7. The boundary display elements 212, 214, 216, 218 are transparent except for their outer perimeters 1302 and their text display element regions. The first boundary display object is removed, since in this example, the face 610 and body objects 612 are prioritized as a priority scene region.

FIG. 13C is an illustrative drawing representing compositing of the sixth paused ZUI motion picture image 422 of FIG. 5F and the individual captured motion picture image frame 604A of FIG. 7. The text region D of the fourth boundary display element overlays and obscures the fifth object 618, since in this example, the fourth object 618 is not a prioritized as a priority scene region.

Figure 14:
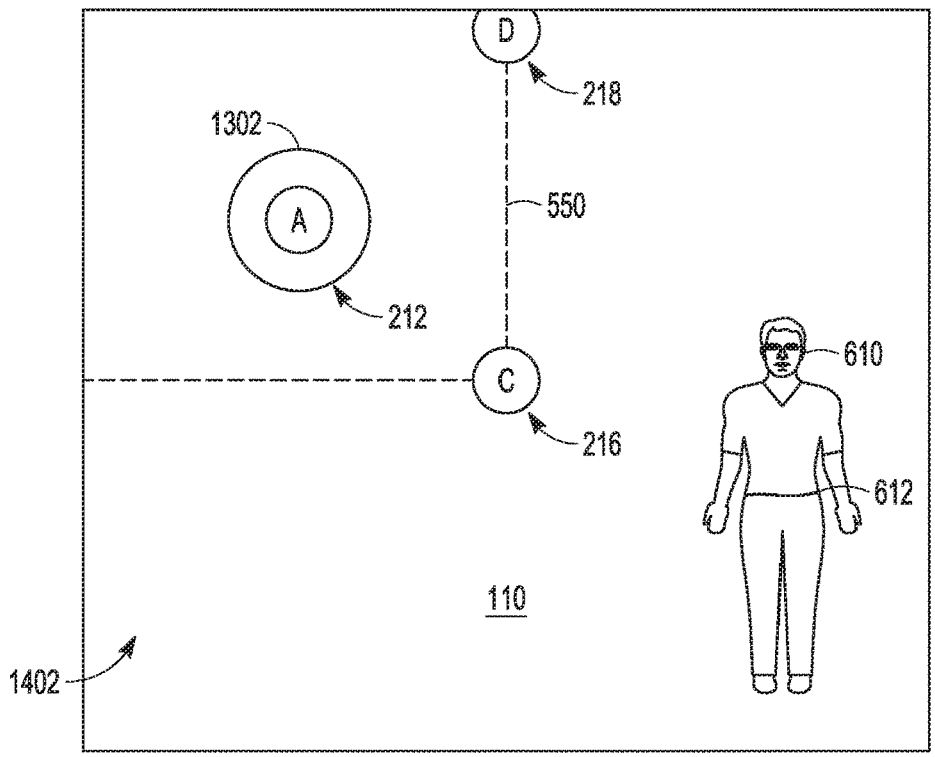
FIG. 14 is an illustrative drawing representing composite image with a changed location of the offset region on the display screen in response to a changed location of prioritized scene region the display screen.

FIG. 14 is an illustrative drawing representing composite image 1402 with a changed location of the offset region 550 on the display screen 110 in response to a changed location of the presenter image 610, 612 on the display screen 110. The scene prioritization and ZUI offset process 1000 of FIG. 10 causes the change in location of the offset region 550 in response to the change in the prioritized scene location, which may be a location of the presenter's face 610, for example. The boundary display element 212 is the current target within the display screen in the composite image 1402.

ZUI Command to Playback Composite Motion Picture Sequence

Figure 15:
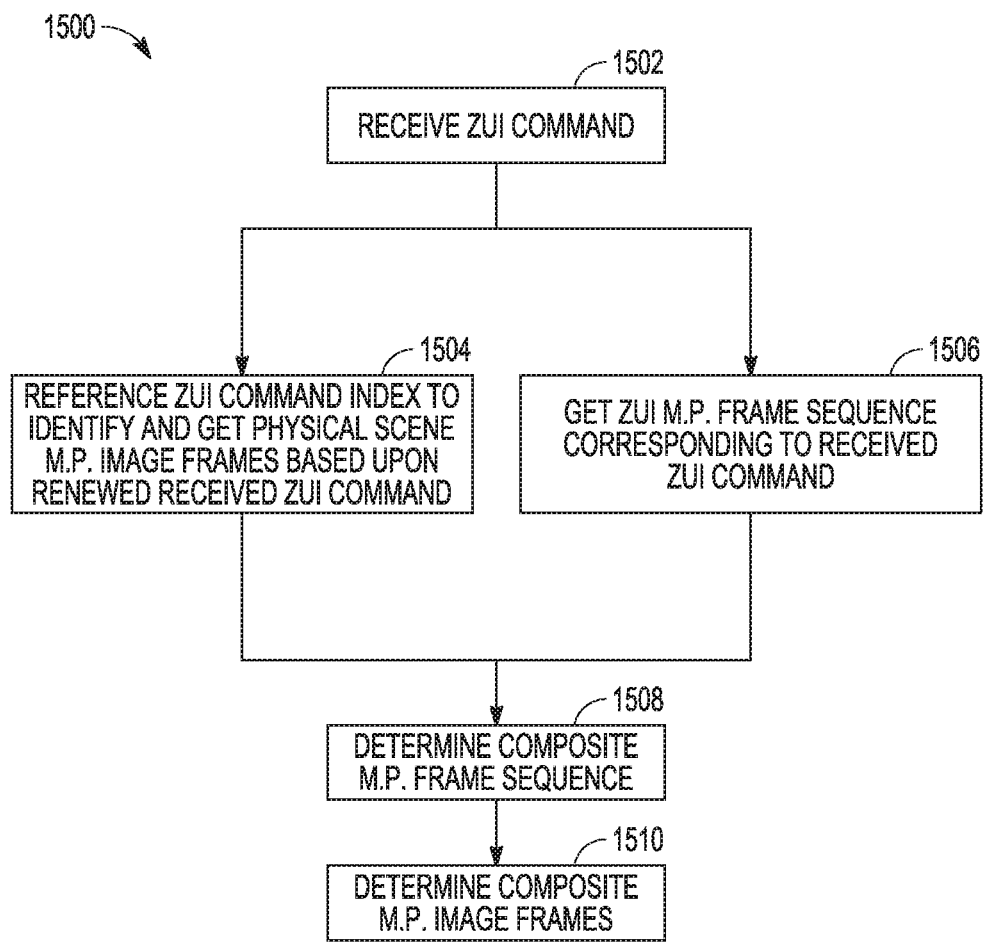
FIG. 15 is an illustrative flow diagram representing a process to display composite physical scene frames and ZUI presentation frames.

FIG. 15 is an illustrative flow diagram representing a process 1500 to display composite physical scene frames and ZUI presentation frames. The computer program instructions 124 include instructions to instruct the computer system 100 to control display of a physical scene segment in concert with a ZUI transition in response to a ZUI command. As explained above, the physical scene motion picture frames are captured by a presenter machine and sent to the viewer machines. The ZUI motion picture frames are determined by a navigation commands received at a presenter machine contemporaneous with the captured physical scene motion picture frames with which they are to be composited. Both the presenter machine and the viewer machines may be configured to use the process 1500 to display composite physical scene motion picture frames and ZUI motion picture frames.

Block 1502 represents computer system 100 receiving a ZUI command that corresponds to a ZUI transition. If the process 1500 is being run on a presenter machine, then the ZUI command will have been input to that machine by the machine's user. If the process 1500 is being run on a viewer machine, then the ZUI command will have been received from the presenter machine. Block 1504 represents the CPU 102 referencing a stored ZUI command index segment 904 to identify and identify a physical scene motion picture frame sequence that corresponds to the received ZUI command. If the process 1500 is being run on a presenter machine, then the physical scene motion picture frame sequence will have been captured by that machine's camera, and the index segment will have been created by that machine. If the process 1500 is being run on a viewer machine, then the physical scene motion picture frame sequence and the index segment will have been received from the presenter machine. Block 1506 represents the CPU 102 getting ZUI presentation frames that correspond to the received ZUI command. Block 1508 represents compositing the gotten physical scene motion picture frames and the gotten ZUI presentation motion picture frames. The processes of FIGS. 10-12 may be used for the compositing. Block 1510 represents display of motion picture images on the display screen 110 using the composited motion picture frames.

Thus, a user can use a ZUI command to display a segment of a motion picture recording of a physical scene based upon the ZUI command that was received at the time the physical scene motion picture segment was recorded. For example, assume that block 1502 receives ZUI command C2. Referring to FIG. 9, in response to ZUI command C2, block 1504 uses the ZUI command index 904 to identify and to get a physical scene motion picture sequence 920. Referring to the motion picture segments of FIG. 4, in response to ZUI command C2, block 1506 gets a motion picture sequence 413, 414. Block 1408 composites the gotten frames. Block 1510 displays composited frames 414, 604A shown in FIG. 13A.

Figure 16:
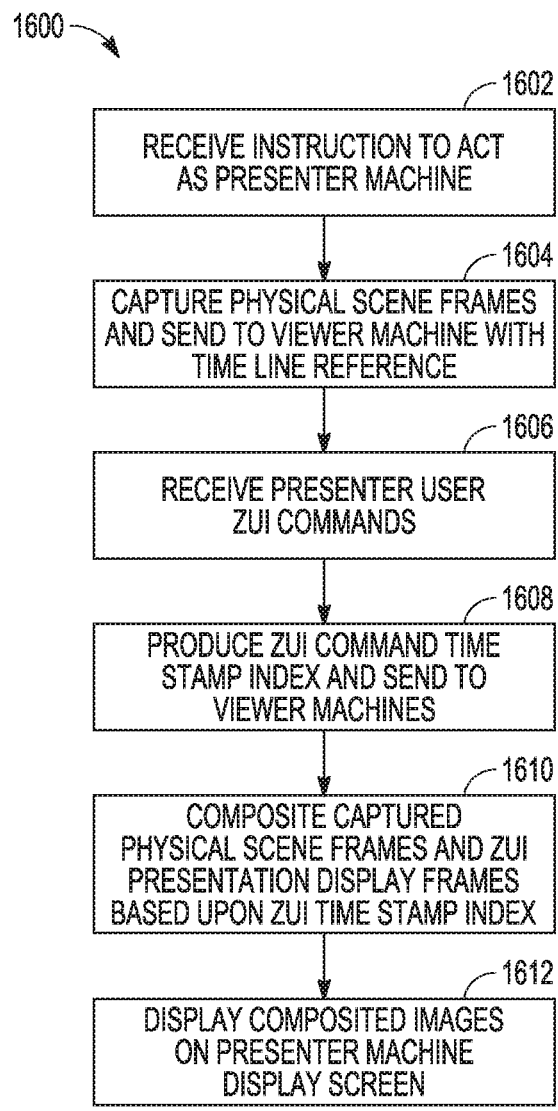
FIG. 16 is an illustrative flow diagram representing a flow diagram 1600 representing overall flow in capturing and processing of physical scene information and ZUI command information by a machine in a presenter mode.

FIG. 16 is an illustrative flow diagram representing a flow diagram 1600 representing overall flow in capturing and processing of physical scene information and ZUI command information by a machine in a presenter mode. The computer program instructions 124 include compositing instructions to configure machine 100 in a presenter mode in which to act as a presenter machine to capture and process physical scene information and ZUI command information. Block 1602 received instructions to act as a presenter machine. Block 1604 captures physical scene frames and sends them to the viewer machines with a time reference to indicate frames based upon frame capture time sequence. Block 1606 receives user input indicating ZUI navigation commands. Block 1608 produces a ZUI command time stamp index based upon the time reference. Block 1610 composites the captured physical frames and the ZUI presentation displays based upon the ZUI command time stamp index. Block 1612 displays composited images on the presentation machine display screen.

Figure 17:
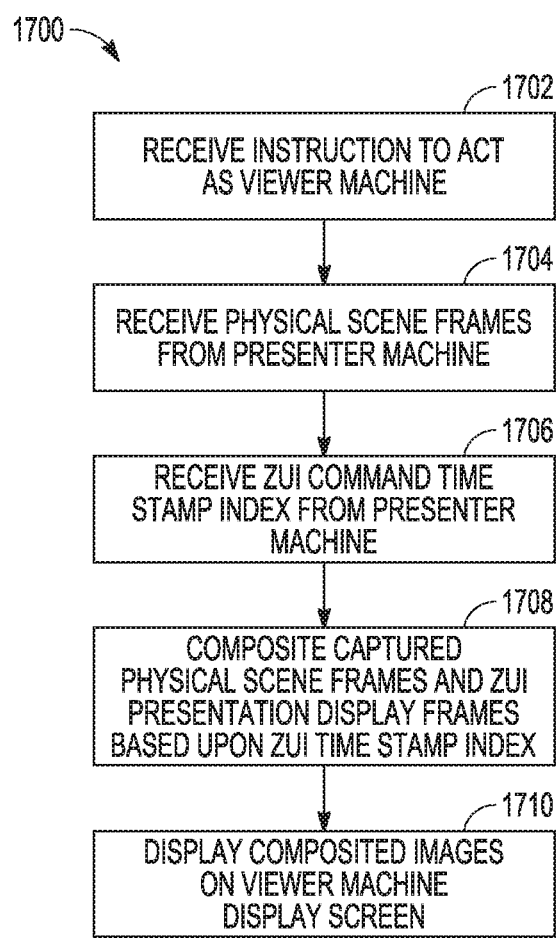
FIG. 17 is an illustrative flow diagram representing a flow diagram 1700 representing overall flow in capturing and processing of physical scene information and ZUI command information by a viewer machine in a viewer mode.

FIG. 17 is an illustrative flow diagram representing a flow diagram 1700 representing overall flow in capturing and processing of physical scene information and ZUI command information by a viewer machine in a viewer mode. The computer program instructions 124 include compositing instructions to configure machine 100 to act as a viewer machine to receive and process physical scene information and ZUI command information. Block 1702 receives instructions to act as a viewer machine. Block 1704 receives from a presenter machine machine physical scene frames with a time reference to indicate frames based upon frame capture time sequence. Block 1706 receives a ZUI command time stamp index based upon the time reference. Block 1708 composites the captured physical frames and the ZUI presentation displays based upon the ZUI command time stamp index. Block 1710 displays composited images on the viewer machine display screen.

In the preceding description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. An electronic presentation system comprising:
   a computer system including:
      at least one processor;
      a non-transitory computer readable medium operably coupled to the at least one processor, the non-transitory computer readable medium comprising:
         a plurality of instructions stored in association therewith that are accessible to, and executable by, the at least one processor and,
      a zooming user interface (ZUI) presentation that includes ZUI motion picture frames that include display element transitions and that provides associations between ZUI commands and display of the display element transitions within the ZUI motion picture frames;
   an image capture device configured to capture motion picture image frames of a physical scene;
   a user interface;
   a data interface device to send and receive information over a network; and
   a display screen;
   an image frame buffer including a first prefetch buffer and a second prefetch buffer operably coupled to the at least one processor, to composite motion picture image frames of a physical scene and ZUI motion picture frames within the ZUI presentation;
   wherein the plurality of instructions comprises:
      instructions that, when executed, configure the at least one processor,
      in a presenter mode,
      to record in the first prefetch buffer, first motion picture image frames of a first physical scene captured at the image capture device,
      to record in the second prefetch buffer, first ZUI motion picture frames, from within the ZUI presentation, that include a first display element transition, responsive to a first ZUI command received at the user interface;
      to produce first composite motion picture frames based upon the first motion picture image frames recorded in the first prefetch buffer and the first ZUI motion picture frames that include the at least one first display element transition recorded in the second prefetch buffer, by prioritizing display of the first motion picture image frames of the first physical scene in a portion of the display screen and prioritizing display of the first display element transition in a different portion of the display screen,
      to cause the display screen to display the first composite motion picture image frames, and
      to send over the network to another computer system, the first motion picture image frames, the first ZUI command, and a first index portion that associates the motion picture image frames with the first ZUI command,
      in a viewer mode,
      to cause the data interface device to receive over the network from the other computer system, second motion picture image frames of a second physical scene, a second ZUI command, and a second index portion that associates the second motion picture image frames with a second ZUI command,
      to record in the first prefetch buffer, the second motion picture image frames,
      to record in the second prefetch buffer, second ZUI motion picture frames, from within the ZUI presentation, that include the second display element transition, responsive to the second ZUI command,
      to produce second composite motion picture frames based upon the second motion picture image frames recorded in the first prefetch buffer and second ZUI motion picture frames that include the second display element transition recorded in the second pre-fetch buffer, by prioritizing display of the second motion picture image frames in a portion of the display screen and prioritizing display of the second display element transition in a different portion of the display screen, and to cause the display screen to display the second composite motion picture image frames.

2. The electronic presentation system of claim 1, wherein the first and second display element transitions includes flat transitions between display elements.

3. The electronic presentation system of claim 1, wherein the first and second display element transitions includes only flat transitions between display elements.

4. The electronic presentation system of claim 1, wherein the first and second display element transitions includes panning and zooming between one or more display elements.

5. The electronic presentation system of claim 1, wherein the first and second display element transitions includes panning and zooming between one or more display elements and a halt at a target display element.

6. The electronic presentation system of claim 1, wherein the plurality of instructions further comprises:
instructions that, when executed,
in the presenter mode and in the viewer mode,
configure the at least one processor to cause the display screen to display a prescribed object from within the physical scene at the prioritized scene region of the display screen.

7. The electronic presentation system of claim 1, wherein the plurality of instructions further comprises:
instructions that, when executed, configure the at least one processor,
in the respective presenter mode and in the respective viewer mode,
to cause the display screen to display prescribed portions of the respective first and second display element transitions within the prioritized display region of the display screen.

8. The electronic presentation system of claim 1, wherein the plurality of instructions further comprises:
instructions that, when executed, configure the at least one processor,
in the respective presenter mode,
to associate the first display element transitions with the first motion picture image frames based upon motion picture images of the physical scene displayed by the display screen at times of user commands causing the first display element transitions.

9. The electronic presentation system of claim 1, wherein the plurality of instructions further comprises:
instructions that, when executed, configure the at least one processor,
in the presenter mode,
to produce a command index in the computer readable medium that associates received user commands with motion picture image frames.

10. The electronic presentation system of claim 1, wherein the plurality of instructions further comprises:
instructions that, when executed, configure the at least one processor,
in the respective presenter mode,
to produce a command index in the computer readable medium that associates received user commands with motion picture image frames based upon alignment of time of display of the first motion picture images of the first physical scene displayed by the display screen and times of occurrence of the received user commands to cause the first display element transitions.

11. A method to share presentation of a sequence of display elements over a network, comprising:
at a first computer system configured in a presenter mode,
recording motion picture images of a physical scene in a sequence of motion picture image frames;
displaying on a display screen at the first computer system the motion picture images of the physical scene recorded in the sequence of motion picture image frames;
receiving user commands at a user interface during the displaying of the motion picture images;
displaying on the display screen at the first computer system a sequence of display element transitions responsive to the received user commands;
producing a command index in a computer readable medium that associates the received user commands with the motion picture image frames;
sending the sequence of motion picture frames, the received user commands, and the command index to a second computer system over a network; and
at the second computer system configured in a viewer mode,
receiving the sequence of motion picture frames, the received user commands, and the command index from the first computer system over the network;
displaying on a display screen at the second computer system the motion picture images of the physical scene recorded in the sequence of motion picture image frames;
displaying on the display screen at the second computer system a sequence of display element transitions responsive to the received user commands; and
time aligning the display element transitions with motion picture frames of the sequence of motion picture image frames based upon the command index, in the course of displaying at the second computer system the sequence of display element transitions.

12. The method of claim 11 further including:
at the first computer system,
compositing the motion picture images of the physical scene and the sequence of display element transitions by prioritizing display of the motion picture images of the physical scene in a prioritized scene region of the display screen at the first computer system and prioritizing display of the sequence of display element transitions in a prioritized display region of the display screen at the first computer system,
at the second computer system,
compositing the motion picture images of the physical scene and the sequence of display element transitions by prioritizing display of the motion picture images of the physical scene in a prioritized scene region of the display screen at the second computer system and prioritizing display of the sequence of display element transitions in a prioritized display region of the display screen at the second computer system.

13. The method of claim 11 further including:
at the second computer system in the presenter mode,
recording motion picture images of the physical scene in a sequence of motion picture image frames;

displaying on the display screen at the second computer system the motion picture images of the physical scene recorded in the sequence of motion picture image frames;

receiving user commands at a user interface during the displaying of the motion picture images;

displaying on the display screen at the second computer system a sequence of display element transitions responsive to the received user commands;

producing a command index in a computer readable medium that associates the received user commands with the motion picture image frames;

sending the sequence of motion picture frames, the received user commands, and the command index to a first computer system over a network; and at the first computer system in the viewer mode, receiving the sequence of motion picture frames, the received user commands, and the command index from the second computer system over the network;

displaying on the display screen at the first computer system the motion picture images of the physical scene recorded in the sequence of motion picture image frames;

displaying on the display screen at the first computer system a sequence of display element transitions responsive to the received user commands, and time aligning the display element transitions with motion picture frames of the sequence of motion picture image frames based upon the command index, in the course of displaying on the display screen at the first computer system the sequence of display element transitions.

14. The electronic presentation system of claim 1,
wherein the plurality of instructions further comprises:
instructions that, when executed, configure the at least one processor,
in the presenter mode,
to determine the portion of the display screen in which to prioritize display of the first motion picture image frames and the portion of the display screen in which to prioritize display of the at least one first display element transition,
in the viewer mode,
to determine the portion of the display screen in which to prioritize display of the second motion picture image frames and the portion of the display screen in which to prioritize display of the at least one second display element transition.

15. A method to share presentation of a sequence of display elements over a network, comprising:
at a first computer system configured in a presenter mode,
recording motion picture images of a first physical scene in a first sequence of motion picture image frames;
displaying on a display screen at the first computer system the first motion picture images of the physical scene recorded in the first sequence of motion picture image frames;
receiving first user commands at a user interface during the displaying of the first motion picture images;
displaying on the display screen at the first computer system a first sequence of display element transitions responsive to the first received user commands;
producing a first command index in a computer readable medium that associates the first received user commands with the first motion picture image frames;
sending the sequence of first motion picture frames, the first received user commands, and the first command index to a second computer system over a network; and at the first computer system configured in a viewer mode,
receiving a second sequence of motion picture frames that record motion picture images of a second physical scene, second user commands, and a second command index from the second computer system over the network;

displaying on the display screen at the first computer system the second motion picture images of the second physical scene recorded in the second sequence of motion picture image frames;

displaying on the display screen at the first computer system a second sequence of display element transitions responsive to the second received user commands; and time aligning the second display element transitions with the second motion picture frames of the second sequence of motion picture image frames based upon the second command index, in the course of displaying at the first computer system, the second sequence of display element transitions.

16. The method of claim 15 further including:
at the second computer system configured in a presenter mode,
recording the second motion picture images of the second physical scene in the second sequence of motion picture image frames;
displaying on a display screen at the second computer system the second motion picture images of the second physical scene recorded in the second sequence of motion picture image frames;
receiving the second user commands at a user interface during the displaying of the second motion picture images;
displaying on the display screen at the second computer system the second sequence of display element transitions responsive to the second received user commands;
producing the second command index in a computer readable medium that associates the second received user commands with the second motion picture image frames;
sending the second sequence of second motion picture frames, the second received user commands, and the second command index to the first computer system over a network;
at the second computer system in the viewer mode,
receiving the first sequence of motion picture frames, the first received user commands, and the first command index from the first computer system over the network;
displaying on the display screen at the second computer system the first motion picture images of the first physical scene recorded in the first sequence of motion picture image frames;
displaying on the display screen at the second computer system a first sequence of display element transitions responsive to the first received user commands; and
time aligning the first display element transitions with first motion picture frames of the first sequence of motion picture image frames based upon the first command index, in the course of displaying on the display screen at the second computer system the first sequence of display element transitions.

17. The method of claim 15 further including:
at the first computer system,
compositing the first motion picture images of the first physical scene and the first sequence of display element transitions by prioritizing display of the first motion picture images of the first physical scene in a prioritized scene region of the display screen at the first computer system and prioritizing display of the first sequence of display element transitions in a prioritized display region of the display screen at the first computer system; and at the first computer system, compositing the second motion picture images of the second physical scene and the second sequence of display element transitions by prioritizing display of the second motion picture images of the second physical scene in a prioritized scene region of the display screen at the first computer system and prioritizing display of the second sequence of display element transitions in a prioritized display region of the display screen at the first computer system.

18. The method of claim 16 further including:

at the first computer system, compositing the first motion picture images of the first physical scene and the first sequence of display element transitions by prioritizing display of the first motion picture images of the first physical scene in a prioritized scene region of the display screen at the first computer system and prioritizing display of the first sequence of display element transitions in a prioritized display region of the display screen at the first computer system;

at the first computer system, compositing the second motion picture images of the second physical scene and the second sequence of display element transitions by prioritizing display of the second motion picture images of the second physical scene in a prioritized scene region of the display screen at the first computer system and prioritizing display of the second sequence of display element transitions in a prioritized display region of the display screen at the first computer system;

at the second computer system, compositing the first motion picture images of the first physical scene and the first sequence of display element transitions by prioritizing display of the first motion picture images of the first physical scene in a prioritized scene region of the display screen at the second computer system and prioritizing display of the first sequence of display element transitions in a prioritized display region of the display screen at the second computer system;

at the second computer system, compositing the second motion picture images of the second physical scene and the second sequence of display element transitions by prioritizing display of the second motion picture images of the second physical scene in a prioritized scene region of the display screen at the second computer system and prioritizing display of the second sequence of display element transitions in a prioritized display region of the display screen at the second computer system.

19. An article of manufacture including a non-transitory machine-readable storage medium including instructions that, when executed by a computer system, cause the computer system to perform operations comprising:

at a first computer system, in a presenter mode, recording motion picture images of a first physical scene in a first sequence of motion picture image frames;

displaying on a display screen at the first computer system the first motion picture images of the physical scene recorded in the first sequence of motion picture image frames;

receiving first user commands at a user interface during the displaying of the first motion picture images;

displaying on the display screen at the first computer system a first sequence of display element transitions responsive to the first received user commands;

producing a first command index in a computer readable medium that associates the first received user commands with the first motion picture image frames;

sending the sequence of first motion picture frames, the first received user commands, and the first command index to a second computer system over a network; and at the first computer system, in a viewer mode, receiving a second sequence of motion picture frames that record motion picture images of a second physical scene, second user commands, and a second command index from the second computer system over the network;

displaying on the display screen at the first computer system the second motion picture images of the second physical scene recorded in the second sequence of motion picture image frames;

displaying on the display screen at the first computer system a second sequence of display element transitions responsive to the second received user commands; and time aligning the second display element transitions with the second motion picture frames of the second sequence of motion picture image frames based upon the second command index, in the course of displaying at the first computer system, the second sequence of display element transitions.

* * * * *

UNITED STATES PATENT AND TRADEMARK OFFICE
CERTIFICATE OF CORRECTION

PATENT NO. : 10,545,626 B2
APPLICATION NO. : 15/961207
DATED : January 28, 2020
INVENTOR(S) : Somlai-Fischer et al.

Page 1 of 1

It is certified that error appears in the above-identified patent and that said Letters Patent is hereby corrected as shown below:

In the Claims

Column 26, Line 9, in Claim 1, delete "frames:" and insert --frames;-- therefor

Column 27, Line 34, in Claim 7, after "comprises:", insert --¶--

Column 29, Line 26, in Claim 13, delete "commands," and insert --commands;-- therefor Signed and Sealed this
Twelfth Day of May, 2020

Andrei Iancu
*Director of the United States Patent and Trademark Office*